US012771997B2

(12) United States Patent
Nielsen et al.

(10) Patent No.: US 12,771,997 B2
(45) Date of Patent: Oct. 20, 2026

(54) METHOD AND TRANSDUCER ARRAY SYSTEM FOR DIRECTIONALLY REPRODUCING AN INPUT AUDIO SIGNAL

(71) Applicant: Soundfocus ApS, Risskov (DK)

(72) Inventors: Søren Henningsen Nielsen, Aarhus N (DK); Kim Rishøj Pedersen, Egå (DK)

(73) Assignee: Soundfocus ApS, Risskov (DK)

( * ) Notice: Subject to any disclaimer, the term of this patent is extended or adjusted under 35 U.S.C. 154(b) by 139 days.

(21) Appl. No.: 18/577,581

(22) PCT Filed: Jul. 9, 2021

(86) PCT No.: PCT/DK2021/050232
§ 371 (c)(1),
(2) Date: Jan. 8, 2024

(87) PCT Pub. No.: WO2023/280356
PCT Pub. Date: Jan. 12, 2023

(65) Prior Publication Data
US 2024/0365062 A1 Oct. 31, 2024

(51) Int. Cl.
*H04R 3/04* (2006.01)
*H04R 3/12* (2006.01)
(Continued)

(52) U.S. Cl.
CPC ................ *H04R 3/04* (2013.01); *H04R 3/12* (2013.01); *H04R 5/02* (2013.01); *H04R 5/04* (2013.01);
(Continued)

(58) Field of Classification Search
CPC ... H04R 3/04; H04R 3/12; H04R 5/02; H04R 5/04; H04R 2201/403; H04R 2430/03
(Continued)

(56) References Cited

U.S. PATENT DOCUMENTS 5,870,484 A 2/1999 Greenberger
5,930,373 A * 7/1999 Shashoua .............. H03G 9/005 381/98

(Continued)

FOREIGN PATENT DOCUMENTS

EP 0410352 A2 1/1991
EP 2720477 B1 3/2016

(Continued)

OTHER PUBLICATIONS

International Search Report and Written Opinion mailed May 23, 2022 in International Application No. PCT/DK2021/050232, 17 pages.

*Primary Examiner* — Disler Paul
(74) *Attorney, Agent, or Firm* — Lee & Hayes, P.C.

(57) ABSTRACT

Disclosed is a method for directionally reproducing an input audio signal by a transducer array comprising a plurality of transducers, the method comprising receiving said input audio signal and processing by signal processing to generate a processed audio signal, the processing comprising filtering harmonics in a directionally controllable frequency band, each of said harmonics corresponding to a lower order harmonic in a bass frequency band, wherein said bass frequency band comprises frequencies below said directionally controllable frequency band, generating a plurality of driving signals for said plurality of transducers, wherein said plurality of driving signals are generated on the basis of said processed audio signal by application of directional control filters, and reproducing directional sound representing said input audio signal based on said plurality of generated driver signals using said transducer array. A transducer array system for directionally reproducing an input audio signal is further disclosed.

19 Claims, 13 Drawing Sheets

Figure 1:
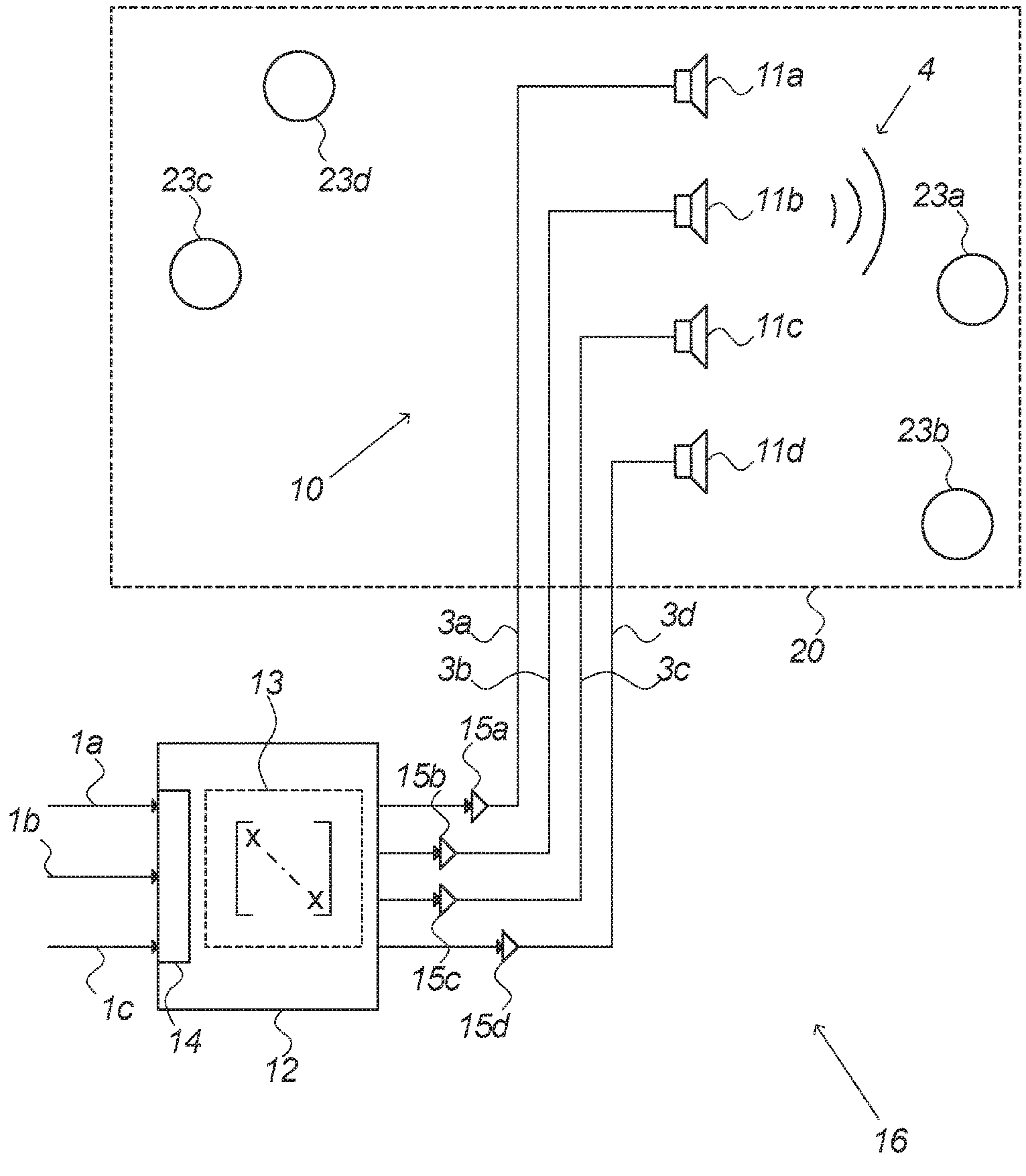

(51) Int. Cl.
*H04R 5/02* (2006.01)
*H04R 5/04* (2006.01)

(52) U.S. Cl.
CPC .... *H04R 2201/403* (2013.01); *H04R 2430/03* (2013.01)

(58) Field of Classification Search
USPC .......................................... 381/98–99, 63, 103
See application file for complete search history.

(56) References Cited

U.S. PATENT DOCUMENTS

| | | | | |
|---|---|---|---|---|
| 7,970,153 | B2 * | 6/2011 | Konagai | H04R 1/403 381/98 |
| 8,638,959 | B1 * | 1/2014 | Hall | H04R 1/24 381/160 |
| 8,965,546 | B2 * | 2/2015 | Visser | H04R 3/12 381/182 |
| 9,191,743 | B2 * | 11/2015 | Beer | H04R 3/12 |
| 10,893,362 | B2 * | 1/2021 | You | H04R 3/04 |
| 11,736,081 | B2 * | 8/2023 | Port | G10L 21/02 381/103 |
| 2010/0246854 | A1 * | 9/2010 | Aarts | H04R 3/14 381/101 |
| 2011/0142258 | A1 | 6/2011 | Beer | |
| 2012/0020480 | A1 | 1/2012 | Erik | |
| 2013/0259254 | A1 * | 10/2013 | Xiang | H04K 3/45 381/73.1 |

FOREIGN PATENT DOCUMENTS

| | | | |
|---|---|---|---|
| JP | 4400474 | B2 | 1/2010 |
| WO | WO2008111023 | A2 | 9/2008 |

* cited by examiner

METHOD AND TRANSDUCER ARRAY SYSTEM FOR DIRECTIONALLY REPRODUCING AN INPUT AUDIO SIGNAL

CROSS REFERENCE TO RELATED APPLICATIONS

This application is a U.S. National Phase Application of International Application No. PCT/DK2021/050232, filed Jul. 9, 2021, which is hereby incorporated by reference in its entirety.

FIELD OF THE INVENTION

The present invention relates to a method and a transducer array system for directionally reproducing an audio signal by a transducer array.

BACKGROUND OF THE INVENTION

Transducer arrays are known and used to affect the physical world in some desired way, for instance to create a sound field in a room or a vibration pattern in a mechanical structure. Typically, such transducer arrays are controlled by suitable digital signal processing of the drive signals applied to transducer arrays. An inherent property of transducer arrays is that the directional characteristics are strongly frequency dependent—in particular towards the lower frequencies—which means that a physically large array is normally necessary to achieve a good control of the radiation directions at lower frequencies.

The distribution of sound from sound reproduction systems in an acoustical environment, such as a room, is often different than desired—more specifically sound is reproduced at unwanted locations within the acoustical environment. A common solution to this problem is to use an array loudspeaker, however, such a loudspeaker may be large and costly.

Furthermore, most array loudspeakers have simple geometries, like line arrays for example, and radiate sound directionally in one dimension but omnidirectionally in another dimension. This may lead to undesired sound radiation in certain areas of the acoustical environment and to undesired reflections from walls and other objects present in the acoustical environment. One way of addressing this issue is to increase the size of the array by introducing an additional dimension of the array to achieve better directional control. This, however, is a costly way of addressing this problem, and furthermore, large array sizes are often not desired by users of array loudspeakers.

Furthermore, it may be desirable to use a small type of loudspeaker driver in order to achieve a good directional control at high frequencies, and preferably the same type of loudspeaker driver to reduce the cost of the loudspeaker array, but this presents problems of weak bass reproduction and a challenge of reproducing a large frequency range.

Furthermore, it may be desirable to reproduce two or more different input signals to different areas, however, typical array loudspeakers are only able to handle one input with its corresponding directional characteristics. This leads to the use of several array loudspeakers, one for each input signal. This is a costly solution.

It is therefore an object of the present invention to provide a method and a system for directionally reproducing one or more input audio signals in a cost-effective way using a single compact transducer array and in a way with an improved perceived sound quality.

SUMMARY OF THE INVENTION

The inventors have identified the above-mentioned problems and challenges related to directional reproduction of sound using a transducer array, and subsequently made the below-described invention which provides a number of improvements over conventional transducer arrays.

An aspect of the invention relates to a method for directionally reproducing an input audio signal by a transducer array comprising a plurality of transducers, the method comprising the steps of:

- receiving said input audio signal;
- processing said input audio signal by signal processing to generate a processed audio signal, wherein said processing comprises filtering harmonics in a directionally controllable frequency band, each of said harmonics corresponding to a lower order harmonic in a bass frequency band of said input audio signal, wherein said bass frequency band comprises frequencies below said directionally controllable frequency band;
- generating a plurality of driving signals for said plurality of transducers by signal processing, wherein said plurality of driving signals are generated on the basis of said processed audio signal by application of directional control filters; and
- reproducing directional sound representing said input audio signal based on said plurality of generated driver signals using said transducer array.

A particular challenge of directionally reproducing an audio signal is that the low frequency content of the audio signal is difficult to control due to the relatively large wavelengths of sound associated with these frequencies. When reproducing an audio signal using a transducer array comprising a plurality of transducers it may be possible to control the directionality of most parts of the frequencies of the audio signal. However, even for such a transducer array there remains a challenge of directionally reproducing the low-frequency content of an audio signal.

The present method for directionally reproducing an audio signal provides an advantageous way of processing an audio signal which utilizes the fact that sound is perceived in a particular way by humans. A phenomenon called virtual pitch can be used to give a perception of a low-pitched signal, even without the fundamental frequency corresponding to the low pitch being present in the signal.

Pitch is an auditory sensation in which a listener assigns musical tones to relative positions on a musical scale based primarily on their perception of the frequency of vibration. Pitch is closely related to frequency, however the two are not equivalent. Frequency is an objective, scientific attribute that can be measured. Pitch, however, is a person's subjective perception of a sound wave, which cannot be measured. However, this does not necessarily mean that most people won't agree on which notes are higher and lower. Pitched musical instruments are often based on an acoustic resonator such as a string or a column of air, which oscillates at numerous modes simultaneously. At the frequencies of each vibrating mode, waves travel in both directions along the string or air column, reinforcing and cancelling each other to form standing waves. The interaction of these standing waves with the surrounding air causes audible sound waves, which travels away from the instrument. Because of the typical spacing of the resonances, these frequencies are mostly limited to integer multiples, or harmonics, of the lowest frequency, or the fundamental frequency, and such multiples form a harmonic series. The harmonics have an influence on the pitch. The musical pitch of a note is usually perceived as the lowest order harmonic present (the fundamental frequency, or simply the fundamental), which may be the one created by vibration over the full length of the string or air column, or a higher harmonic chosen by the player. The musical timbre of a steady tone from such an instrument is strongly affected by the relative strength of each harmonic.

The phenomenon of virtual pitch is particularly utilized by the method of the present invention where an input audio signal is processed by filtering harmonics in the audio signal. By filtering harmonics in a directionally controllable frequency band it becomes possible to represent low-frequency audio content of an input audio signal by correspondingly higher frequency harmonics and thereby possible to obtain a perception of low frequency sounds present in the input audio signal but not necessarily reproduced, or at least attenuated, by the transducer array. This filtering of harmonics may also be regarded as bass substitution, i.e., substitution of low frequency sounds by higher order corresponding harmonics. This enables a listener, e.g., a person, to perceive the lower order harmonic in the bass frequency band even though this lower order harmonic is not as such reproduced by the transducer array. Performing such a bass substitution is highly advantageous since the substituted harmonics are at higher frequencies which are much easier to control the directionality of.

The method according to the present invention is furthermore advantageous in that the size of the transducer array needed for the reproduction of the input audio signal may be greatly reduced. Without the use of the above method a transducer array would have to be large, in one or more dimensions, in order to control the directionality of low-frequency sounds since the wavelength of sound increases with decreasing frequency. Reducing the size of the transducer array greatly improves the versatility of the transducer array and allows for a greater number of applications of the transducer array.

The method according to the present invention is furthermore advantageous in that a simple transducer array may be utilized without compromising perceived sound. Using a small type of transducer may be desirable to achieve a good directional control at high frequencies as the spacing between the transducers determine the degree of directional control possible. It may, however, be challenging to reproduce a large frequency range using a single type of transducer, such as a small transducer, and especially bass reproduction may be weak which reduces the perceived quality of the produced sound. A typical way of producing good quality sound over a large range of frequencies involves the use of different types of transducers such as woofers for low-frequency sounds and tweeters for high-frequency sounds. By the above method, the simplicity of the transducer array may be improved since only a single type of transducer, such as a small transducer, may be required in order to produce good perceived sound quality because of the above-described bass substitution principle where lower-order harmonics, or fundamentals, are substituted by higher-order corresponding harmonics.

The method according to the present invention is furthermore advantageous in that the cost of the transducer array may be reduced owing to the reduced size requirements of the transducer array and because a single type of transducer may be utilized to cover the whole frequency range of the reproduced sound.

In the context of the present invention, a "transducer" is understood as any kind of device capable of converting electrical signals into acoustic audio signals, such as a loudspeaker.

In the context of the present invention, a "transducer array" is understood as any assembly of a plurality of transducers, such as loudspeakers, wherein the transducers are arranged in a specific configuration, such as in a 1-dimensional configuration, i.e., in a linear configuration in which the transducers are spaced apart along a line, or in a 2-dimensional configuration, e.g., in a grid with rows and columns of transducers, or in a random configuration. The transducer array may indeed take on any configuration of the transducers, and the term "array" is not intended to place any limits on the possible geometrical distribution of the transducers.

In the context of the present invention, an "input audio signal" is understood as any kind of electrical audio signal intended for reproduction. The input audio signal may be an analogue or a digital audio signal. The input audio signal may include any type of audio content to be reproduced, such as speech, music, and other kinds of sounds, e.g., sound alerts and notifications.

In the context of the present invention, a "harmonic" is understood as any member of a harmonic series. A harmonic is a sound wave that has a frequency that is an integer multiple of a fundamental tone. For a vibrating musical string, such as a bass string, fixed at both ends of the string, the fundamental tone, or fundamental frequency, $f_1$ may be expressed as $$f_1 = \frac{v}{2 \cdot L}$$

where v is the speed of a transverse wave on the musical string, and L is the length of the string. The other standing-wave frequencies are $$f_2 = 2 \cdot \frac{v}{2 \cdot L},\ f_3 = 3 \cdot \frac{v}{2 \cdot L},$$

and so on. These higher order harmonics are all integer multiples of the fundamental frequency $f_1$ and are commonly referred to as overtones. The harmonic series for the musical string may be expressed as $$f_n = n \cdot \frac{v}{2 \cdot L} = n \cdot f_1$$

where n is any integer number (n=1,2,3, . . . ), and the lowest harmonic (n=1) in the series corresponds to the fundamental frequency.

The above example merely serves to illustrate the concept of a harmonic series for a given musical instrument. The harmonic series for an instrument depends on the type of boundary conditions for the standing waves of the instrument, and thus on the instrument playing. For example, an open organ pipe (open at both ends of the pipe) is characterized by harmonics having the type of n=1,2,3, . . . , whereas a closed organ pipe (open at one end of the pipe) is characterized by harmonics of the type n=1,3,5, . . . , where the fundamental frequency $f_1$ of the closed pipe is half of the fundamental frequency $f_1$ of the open pipe.

It is appropriate at this point to further elaborate on the meaning of harmonics. In the present disclosure the term "harmonic" refers to modes of vibration of a system that are whole-number multiples of a fundamental mode, and also to the sounds that they generate. However, it is customary to the skilled person to stretch the definition a bit so that it includes modes that are nearly whole-number multiples of the fundamental, for example 2.005 times the fundamental rather than 2. Thus, for the purpose of the present invention, the term "harmonics" encompasses both overtones that are perfect integer multiples of a fundamental, as well as overtones that are not exactly integer multiples of a fundamental. Such non-perfect harmonics may arise to e.g., stiffness in an instrument, for example due to a stiffness in a musical string.

In the context of the present invention, "processing" is understood as any kind of audio processing, such as digital audio processing, arranged to perform operations on an audio signal to produce a modified, or processed, audio signal. The processing may comprise analysis of the audio signals and application of filters, such as frequency filters, to the audio signal.

In the context of the present invention, "filtering harmonics" is understood as processing of harmonics. Filtering harmonics may include selecting and/or providing, e.g., generating, harmonics of a harmonic series corresponding to lower order harmonics to be present in the processed audio signal. The filtering of harmonics may thus comprise selecting a subset of harmonics present in the input audio signal to be carried over in the processed audio signal and may further comprise generating harmonics in the processed audio signal, wherein the generated harmonics corresponds to harmonics in the input audio signal. Filtering harmonics is not as such understood as mitigating harmonics caused by electrical equipment, such as power supplies, although such mitigation may be advantageous, and contemplated by the present invention, if the input audio signal comprises such unwanted disturbances.

In the context of the present invention, a "directionally controllable frequency band" is understood as a range of frequencies of sound where the directionally of the sound is most easily controlled. It is further noted that a directionally controllable frequency range is only a reference to a range of frequencies, and not as such a range of frequencies pertaining to any specific audio signal.

In the context of the present invention, a "bass frequency band" is understood as a range of frequencies of sound comprising the tones of low frequency, i.e., the frequencies of sound that are concentrated around the lower end of audible sound, which generally for the human ear are frequencies of between 20 Hz and 20,000 Hz. As an example, the E-string of a bass guitar vibrates at about 41 Hz which corresponds to a lower range of audible frequencies. It is further noted that a bass frequency range is only a reference to a range of frequencies, and not as such a range of frequencies pertaining to any specific audio signal. In the context of the present invention, a relevant "bass frequency band" may be selected in accordance with the frequency-dependent directionality properties of the transducer array. For example, the bass frequency band may be considered frequencies below e.g., 300 Hz, such as 20 Hz to 300 Hz. The upper border of the bass frequency band may for various acoustic environments and transducer arrays be in the range of from 80 Hz to 800 Hz.

In the context of the present invention, a "driving signal" is understood as an energy-carrying signal which, when applied to a transducer, causes the transducer to convert the electrical energy in the driving signal into acoustic sound energy, such as through actuation of a diaphragm.

In the context of the present invention, "directional control filters" is understood as any kind of filters which when applied on an audio signal with respect to a plurality of transducers, causes the plurality of transducers to directionally reproduce the audio signal. Creating directional sound relies on the different transducers of the transducer array to respond to the same audio signal in different ways. The filters may for example be implemented to delay the audio signal slightly or adjusting the gain to some of the transducers.

In the context of the present invention, "reproducing directional sound" is understood as producing acoustic sound which is predominantly targeted in a specific direction and distance in space.

According to an embodiment of the invention said processing said input audio signal comprises attenuating said bass frequency band of said input audio signal.

Attenuating the bass frequency band, i.e., reducing the level of low bass frequencies, is advantageous in that the directivity of the transducer array may be improved. Reducing the physical level of low bass frequencies comes at a cost as the acoustical level of these low bass frequencies is reduced as well. However, this reduction is advantageously compensated by the filtering of harmonics according to the present invention.

According to an embodiment of the invention said processing said input audio signal uses a high-pass filter for said attenuation of said bass frequency band.

The bass frequency band may advantageously be attenuated by a high-pass filter. The high-pass filter may attenuate frequencies of the input audio signal present in the bass frequency band. A high-pass filter is advantageous in that it may be easily implemented in a signal processing of an audio signal.

In an embodiment of the invention, the high-pass filter may include a corner frequency identical to, or at least comparable to, a border frequency which represents a boundary between the bass frequency band and frequencies above the bass frequency band, such as the directionally controllable frequency band.

According to an embodiment of the invention said processing said input audio signal is level dependent.

The processing of the input audio signal may be level dependent, i.e., the processing may depend on a playback level. In many cases it is acceptable to play some low frequency bass with its broader radiation. It depends on the playback level. At low playback levels, the frequencies in the bass frequency band may not cause disturbances in other directions than the direction in which the input audio signal is to be reproduced. However, at higher playback levels, the low frequency bass must be kept at a sufficiently low level that it is not causing disturbances in these other directions. This implies that the gain of low frequencies in the bass frequency band does not change by the same amount as for higher frequencies when the playback level is changed. In other words, it may be necessary to attenuate the bass frequency band to avoid disturbances in unwanted listening directions.

Attenuating the input audio signal in the bass frequency band is especially advantageous when a high playback level of the transducer array and a great directionality is desired, since a high-level output of low frequency sounds would easily be perceived in other non-desired directions away from the transducer array. Instead of doing so, the low-frequency content of the input audio signal may according to the present invention be represented by higher order harmonics, whereby the input audio signal may be perceived at the desired audio level in the desired listening direction without being perceived, or only to a very small extent, in other listening directions.

It is worth noting that the playback level may be a combination of the user setting of playback gain, often labelled "volume", and the actual signal content which varies considerably over time.

According to an embodiment of the invention said filtering harmonics comprises representing one or more of said lower order harmonics by harmonics within said directionally controllable frequency band.

By representing lower order harmonics by harmonics within the directionally controllable frequency band is understood that harmonics present in the bass frequency band of the input audio signal are represented by, such as substituted by, higher order corresponding harmonics of a same harmonic series, the higher order harmonics being at higher frequencies than the bass frequency band, i.e., in the directionally controllable frequency band.

According to an embodiment of the invention said filtering harmonics comprises utilizing virtual pitch techniques.

By virtual pitch techniques are understood any kind of techniques which may provide the auditory sensation of virtual pitch as explained above.

According to an embodiment of the invention said filtering harmonics comprises increasing a gain of one or more harmonics within said directionally controllable frequency band.

Increasing a gain of one or more harmonics within said directionally controllable frequency band is advantageous in that a credible perception of low frequency content may be achieved. A harmonic present in the bass frequency band of the input audio signal may form part of a harmonic series comprising multiple harmonics, some of which are higher order harmonics present in the directionally controllable frequency band of the input audio signal. By increasing the gain of these higher order harmonics, such as by increasing with a common gain, it may be possible to maintain a timbre of the input audio signal. This is particular advantageous in combination with an attenuation of the bass frequency band, as an improved bass substitution may then be realized.

According to an embodiment of the invention said filtering harmonics comprises generating one or more harmonics in said directionally controllable frequency band on the basis of one or more of said lower order harmonics.

Higher order harmonics corresponding to frequencies in the directionally controllable frequency band may be generated on the basis of one or more lower order harmonics, such as a fundamental, in the bass frequency band of the input audio signal. This is advantageous in that a simple audio processing is required as the generation of higher order harmonics may be produced using simple non-linear functions such as square, cubic and/or exponential functions.

According to an embodiment of the invention said filtering harmonics comprises frequency shifting one or more of said lower order harmonics of said bass frequency band to said directionally controllable frequency band.

By frequency shifting is understood shifting frequencies, such as lower order harmonics present in the bass frequency band, by a common frequency amount. That is, a frequency $f_k$ may be shifted by an amount $\lambda$ to $f_k+\lambda$. The amount $\lambda$ may advantageously be equal to the frequency of one of the harmonics, otherwise the shift may alter the ratio of the harmonics and make an inharmonic sound.

According to an embodiment of the invention said step of generating a plurality of driving signals further comprises gradient processing.

By gradient processing is understood the processing of a signal for use in a gradient loudspeaker. This is particularly suitable when the plurality of transducers comprises transducers arranged as gradient loudspeakers. Using gradient processing it becomes possible to produce a sound signal having a radiation characteristic of the cardioid type.

According to an embodiment of the invention processing said processing of said input audio signal is performed on the basis of an analysis of said input audio signal.

Processing the input audio signal on the basis of an analysis of the input audio signal is advantageous in that the method according to the present invention may be used to directionally reproduce any content of the input audio signal, as the processing can then be made specific to a specific input audio signal. Thereby various types of input audio signals may be reproduced directionally without pre-existing knowledge of the input audio signal in question.

According to an embodiment of the invention said analysis comprises detecting a presence of one or more lower order harmonics in said bass frequency band.

By analysing the input audio signal, for example by use of a level detector, it may be possible to identify/detect lower order harmonics present in the bass frequency band which are to be filtered in the directionally controllable frequency band by use of corresponding higher order harmonics.

According to an embodiment of the invention said analysis is performed in a side chain.

Performing the analysis in a side chain is advantageous in that the analysis may not affect the input audio signal itself, and any adverse effects on the input audio signal that could arise from the analysis of the signal is not carried over from the input audio signal to the processed audio signal.

According to an embodiment of the invention said filtering harmonics is based on a level of said input audio signal.

In some cases, it may be desirable to reproduce the low frequency sounds, and not just higher harmonics of these, if the low frequency sounds are at a low level where disturbances in another sound zone are not intrusive when reproduced.

According to an embodiment of the invention said bass frequency band and said directionally controllable frequency band are separated in frequency by a border frequency, wherein said border frequency is in the range of from 200 Hz to 700 Hz.

The bass frequency band and the directionally controllable frequency band may be adjacent each other in frequency space, such that they together divide a frequency spectrum at a border frequency with the bass frequency band having frequencies below the border frequency and the directionally controllable frequency band having frequencies above the border frequency. The border frequency may be in the range of from 200 Hz to 700 Hz, such as in the range of from 200 Hz to 500 Hz, such as in the range of from 200 Hz to 400 Hz, for example 300 Hz.

According to an embodiment of the invention said bass frequency band comprises frequencies in the range from 0 Hz to 300 Hz.

According to an embodiment of the invention said directionally controllable frequency band comprises frequencies of at least 300 Hz.

The directionally controllable frequency band may comprise frequencies of at least 300 Hz such as frequencies in the audible spectrum that are at least 300 Hz. The directionally controllable frequency band may thus comprise frequencies in the range of from 300 Hz to 20 kHz.

According to an embodiment of the invention at least two of said plurality of driving signals are different driving signals.

Directionally reproducing an audio signal, in e.g., a sound zone, relies on the transducers of the transducer array responding to the same audio signal in different ways. That is, the transducers may receive different driving signals, each driving signal being based on a same processed audio signal. The different driving signals may be achieved by delaying the audio signal slightly or adjusting the gain to some of the transducers such that cross talk is diminished.

According to an embodiment of the invention said directional control filters are applied using any of the methods of acoustic contrast control or pressure matching.

Calculating the filters for directional control may be done by formulating and solving an optimization problem. As an example, the problem may be to maximise the acoustic contrast between an acoustic bright zone (a zone in which sound is intended to be reproduced) and an acoustic dark zone (a zone which excludes the acoustic bright zone and where the sound is not intended to be reproduced). The acoustic contrast is defined as the ratio between the acoustic potential energy density between the acoustic bright zone and the acoustic dark zone. This method is known as acoustic contrast control.

Another method of calculating the filters involves solving another optimization problem, namely, to minimize a difference between the reproduced playback sound field and a target sound field. This method is known as pressure matching.

According to an embodiment of the invention said directional control filters comprise any of finite impulse response filters, infinite impulse response filters, or any combinations thereof.

In an embodiment of the invention, said directional control filters comprise finite impulse response (FIR) filters. Both gain adjustment and delaying the audio signal may advantageously be achieved by use of FIR filters. In such a setup, each transducer of the transducer array is associated with its own respective FIR filter which is likely to be different with respect to the plurality of transducers of the transducer array.

According to an embodiment of the invention said directional control filters comprise integrating finite impulse response filters.

An integrating finite impulse response filter, denoted IFIR filter, utilizes a finite impulse response (FIR) filter in conjunction with an integrator. Such a filter is advantageous in that a good frequency resolution may be achieved by a moderate computational load.

According to an embodiment of the invention said directional control filters are implemented in the form of a matrix.

Implementing the filters for directional control in the form of a matrix is advantageous in that computational savings may be achieved.

According to an embodiment of the invention said directional control filters are adaptive directional control filters.

Adaptive filters are advantageous in that they make it possible to form adaptive sound zones, i.e., sound zones the locations of which change over time. Such adaptive sound zones are particular advantageous when a listener to the audio signal is moving relative to the transducer array. In this way the listener may experience the same listening experience irrespective of the fact that the listener is moving through e.g., a room in which the transducer array is installed.

In an alternative embodiment of the invention, the directional control filters may be implemented using block convolution comprising FFT, multiplication and inverse FFT.

According to an embodiment of the invention said transducer array is a loudspeaker array, and wherein said plurality of transducers are a plurality of loudspeakers.

According to an embodiment of the invention said plurality of loudspeakers comprises one or more gradient loudspeaker.

One way to improve the directional control of a loudspeaker array is to let each loudspeaker in the array have a directional characteristic based on sound pressure gradient in addition to sound pressure. By letting each loudspeaker in the transducer array, e.g., loudspeaker array, have some degree of directional control due to application of pressure gradient loudspeakers, the ability to control the radiation characteristics at low frequencies can be improved compared to a transducer array comprising only pressure loudspeakers.

According to an embodiment of the invention said one or more gradient loudspeakers comprises one or more loudspeakers and gradient control elements.

In general, if two loudspeakers are separated by some distance and driven with signals of opposite polarity, and if the signal applied to the rear source is delayed by a length of time equal to the propagation time between the two loudspeakers, a desirable radiation pattern is produced at low frequencies. This radiation pattern projects sound with higher intensity in the forward direction and lower intensity in the rearward direction. A plot of the radiation intensity has the general shape of a heart, and because of that, is often referred to as a cardioid radiation pattern.

A similar result may actually be obtained using a single loudspeaker. The sound emanating from the back side of a vibrating diaphragm has inverse polarity relative to the sound emanating from the front side of the diaphragm. If the rear radiation is constrained by an enclosure but allowed to exit the enclosure through a port located at a distance from the origin of the front radiation; and, if the rear radiation is delayed by an appropriately designed acoustical system, then a cardioid radiation pattern may be produced over a limited bandwidth. Such a device is referred to as a passive cardioid loudspeaker.

In this way a gradient loudspeaker may be realized in a passive way, i.e., the gradient control is realized by implementing a gradient control element in the form of a port. Other gradient control elements known to the skilled person may also be utilized in order to realize a passive gradient loudspeaker, such as slits, ducts/channels, and/or foam. Such a gradient loudspeaker is advantageous in that the number of expensive system components, such as transducers, may be reduced, thereby resulting in a less expensive transducer array system.

According to an embodiment of the invention said one or more gradient loudspeaker comprises two oppositely facing loudspeakers.

Arranging two loudspeakers such that they are oppositely facing to one another is advantageous in that a first-order directional sound source is achieved. The basic directional characteristics of a single first-order directional sound source comprises three basic shapes: a) spherical, b) figure of eight, c) cardioid. For example, the spherical shape comprises only a pressure component and no pressure gradient component. The figure-of-eight shape, on the other hand, only comprises a pressure gradient component. The cardioid shape comprises both a pressure and a pressure gradient component.

According to an embodiment of the invention the two oppositely facing loudspeakers are separated by a baffle.

Separating the two oppositely facing loudspeakers by a baffle is advantageous in that the efficiency of the loudspeaker is improved since unwanted acoustic shortening may be prevented.

According to an embodiment of the invention said input audio signal is directionally reproduced within a sound zone of an acoustical environment.

In the context of the present invention, a "sound zone" is understood as a spatially limited region inside a space or environment, which may serve various purposes regarding sound reproduction. For example, a sound zone may be a zone in which an audio signal is targeted for reproduction, such as the reproduction of a music track or the audio part of a TV show, however, a sound zone may also be a zone in which silence is preferred, i.e., interference by sound from other sound zones must be minimized. Sound zones may be delimited by physical boundaries such as walls or curtains, but a single room without barriers can also comprise two or more sound zones separated by nothing else than air. A sound zone may for example be defined by its boundaries, e.g., walls, or by a central part, e.g., a couch, a bed, a table, a person, etc. In an example, two rooms sufficiently close to allow acoustic leakage could be two different sound zones in the same acoustic environment. In another example, one room could comprise two or more different sound zones, e.g., one around a desktop and another around a TV set, or one around each bed in a four-bed hospital room, or one around each person in the room.

In the context of the present invention, an "acoustic environment" is understood as an acoustic space in which sound can be perceived an observer. The physical layout and properties of the acoustic environment may affect the acoustics by e.g., improving the quality of the sound or interfere with the sound. These properties may be reflections with boundaries of the acoustic environment such as walls, floors, and ceilings, and objects within the acoustic environment such as structural elements, furniture, and people, or diffraction caused by interaction of sound with the boundaries and objects. For example, an acoustic environment may be a closed environment such as a living room or a bedroom, a house, a hospital ward, an office environment, and a theatre, or an open environment such as a venue for an open concert or a sports event. The acoustic environment is further understood as an environment in which sound reproduced for one sound zone may be perceived in another sound zone, and vice versa. In other words, an acoustic environment comprises a number of sound zones, which are acoustically coupled to some extent.

According to an embodiment of the invention said sound zone is an adaptive sound zone.

In the context of the present invention, an "adaptive sound zone" is understood as a sound zone the spatial location of which may change over time. Such an adaptive sound zone is particular advantageous when a listener to the audio signal is moving relative to the transducer array. In this way the listener may experience the same listening experience irrespective of the fact that the listener is moving through e.g., a room in which the transducer array is installed.

According to an embodiment of the invention said input audio signal is directionally reproduced in said adaptive sound zone by application of adaptive directional control filters.

According to an embodiment of the invention said input audio signal is a first input audio signal, said processed audio signal is a first processed audio signal, and wherein the method further comprises:

- receiving a second input audio signal, said second input audio signal being different from said first input audio signal;
- processing said second input audio signal by signal processing to generate a second processed audio signal, wherein said processing comprises filtering harmonics in a directionally controllable frequency band, each of said harmonics corresponding to a lower order harmonic in a bass frequency band of said second input audio signal;
- generating a plurality of driving signals for said plurality of transducers by signal processing, wherein each driving signal is generated on the basis of said directionally controlled frequency band of said first processed audio signal and said second processed audio signal by application of directional control filters; and
- reproducing directional sound representing said first input audio signal and said second input audio signal based on said generated driver signals using said transducer array.

Receiving and processing a second input audio signal, different from the first input audio signal, and reproducing both input audio signals using the transducer array is advantageous in that the same transducer array may then directionally reproduce two different audio signals. This is particular advantageous if different listeners would like to listen to listen to different respective input audio signals. For example, one listener may listen to radio whereas another listener may listen to a television broadcasting.

According to an embodiment of the invention said first input audio signal is directionally reproduced in a first sound zone and wherein said second input audio signal is directionally reproduced in a second sound zone.

Directionally reproducing the first and second input audio signals in respective first and second sound zones is advantageous in that listeners in different sound zones may experience different listening experiences with none to very little risk of sound mixing. Thus, a listener positioned in the first sound zone may substantially only perceive the first audio signal, whereas a listener positioned in the second sound zone may substantially only perceive the second audio signal.

According to an embodiment of the invention said first sound zone and said second sound zone are spatially non-overlapping.

According to an embodiment of the invention said acoustical environment comprises said first sound zone and said second sound zone.

The two sound zones may each form part of an acoustical environment. For example, the two sound zones may be different regions of a room.

According to an embodiment of the invention said first input audio signal and said second audio signal are different channels of a multi-channel signal, such as a stereo or surround sound signal, and directionally reproduced in a first sound zone.

Arranging the first input audio signal and the second input audio signal as different channels of a multi-channel is advantageous in that a listener may experience audio content from different directions. For example, the two channels of a stereo signal may be reproduced in such a way that a listener present in the first sound zone may experience the two channels as really stemming from different directions.

According to an embodiment of the invention said first input audio signal and second input audio signal are directionally reproduced within a first sound zone and wherein the method further comprises receiving one or more further input audio signals and directionally reproducing the one or more further input audio signals in a second audio zone.

According to an embodiment of the invention said step of processing said input audio signal is performed by a signal processor.

In the context of the present invention, a "signal processor" is understood as any kind of processor capable of digital or analogue processing of an audio signal.

According to an embodiment of the invention said step of generating a plurality of driving signals is performed by a signal processor.

The step of processing the input audio signal to produce a processed audio signal and the step of generating a plurality of driving signals may both be performed using signals processors, e.g., a common signal processor.

According to an embodiment of the invention said signal processor is a digital signal processor.

Another aspect of the invention relates to a transducer array system for directionally reproducing an input audio signal comprising:

- an input arranged to receive an input audio signal;
- one or more signal processors; and
- a plurality of transducers;
- wherein said one or more processors are arranged to process said input audio signal to generate a processed audio signal, wherein said processing comprises filtering harmonics in a directionally controllable frequency band, each of said harmonics corresponding to a lower order harmonic in a bass frequency band of said input audio signal, wherein said bass frequency band comprises frequencies below said directionally controllable frequency band;
- wherein said transducer array system is arranged to generate a plurality of driving signals on the basis of said processed audio signal by application of directional control filters; and
- wherein said plurality of transducers are configured to directionally reproducing said input audio signal based on said plurality of generated driving signals.

In the context of the present invention, a "signal processor" is understood as any kind of processor capable of digital or analogue processing of an audio signal.

According to an embodiment of the invention said transducer array system comprises one or more amplifiers.

According to an embodiment of the invention said transducer array system comprises a plurality of amplifiers, each amplifier of said plurality of amplifiers being configured to adjust a gain of a generated driving signal and provide said gain-adjusted generated driving signal to a respective transducer of said plurality of transducers.

According to an embodiment of the invention said one or more signal processors comprises one or more digital signal processors.

According to an embodiment of the invention said transducer array system comprises a memory configured to store filter coefficients for said directional control filters.

According to an embodiment of the invention said transducer array system is arranged to carry out any of the method steps of any of the above provisions.

According to an embodiment of the invention said transducer array system comprises any system related features of any of the above provisions.

According to an embodiment of the invention said transducer array system is arranged in an enclosure.

The transducer array system with all its components may be arranged in a common enclosure/casing. Such an enclosure is to be regarded as different from an enclosure of a single gradient loudspeaker. Thereby is obtained a single unit having all the capabilities and advantages of the transducer array system, which is easy to handle for a user. A single unit is advantageous in that it is easy to install by a user.

THE DRAWINGS

Figure 2A:
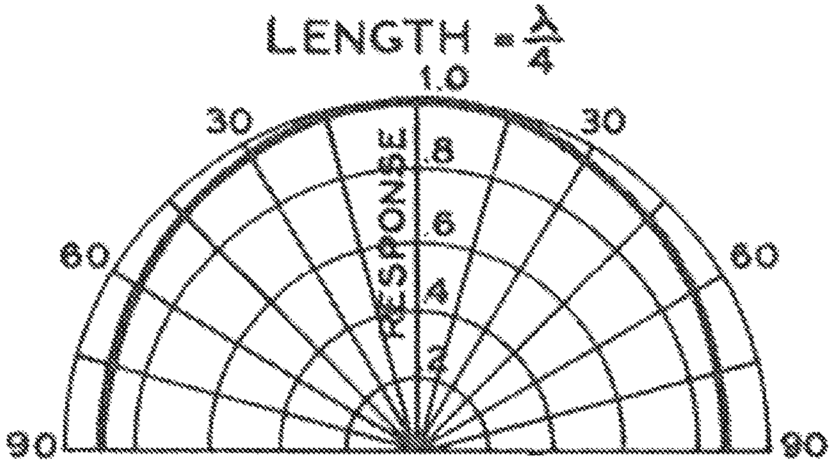
Figure 2B:
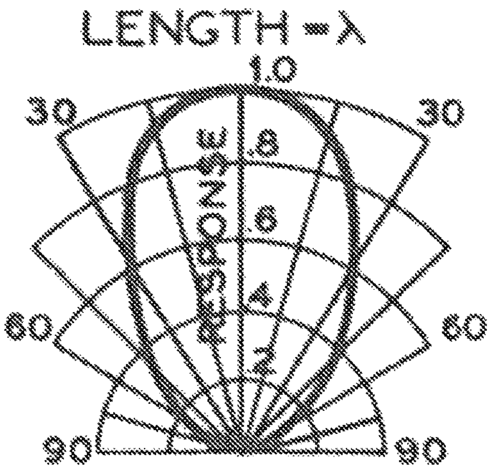
Figure 2C:
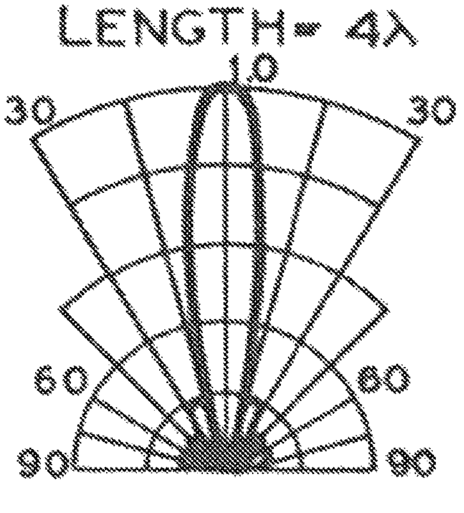
Figure 3:
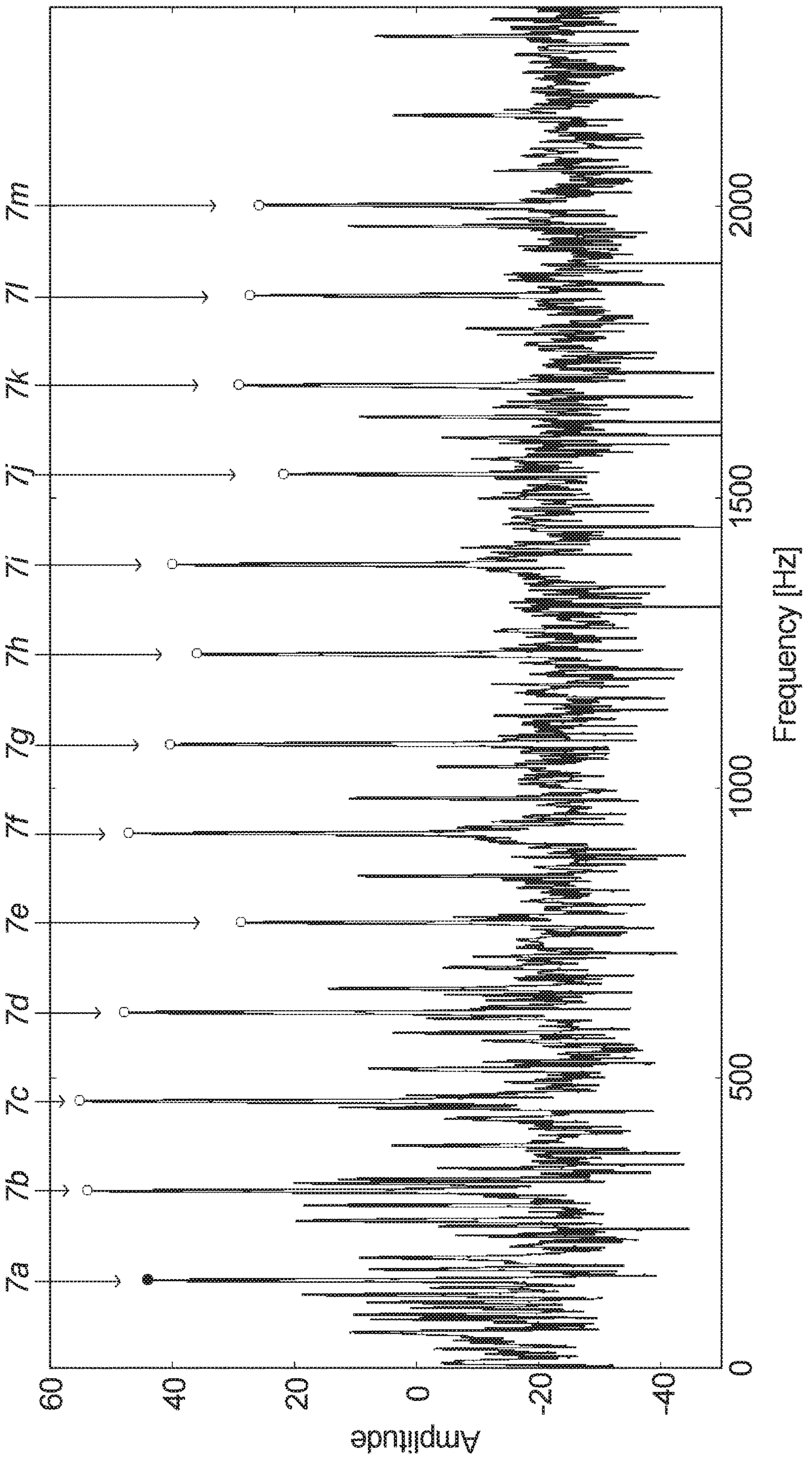
Figure 4:
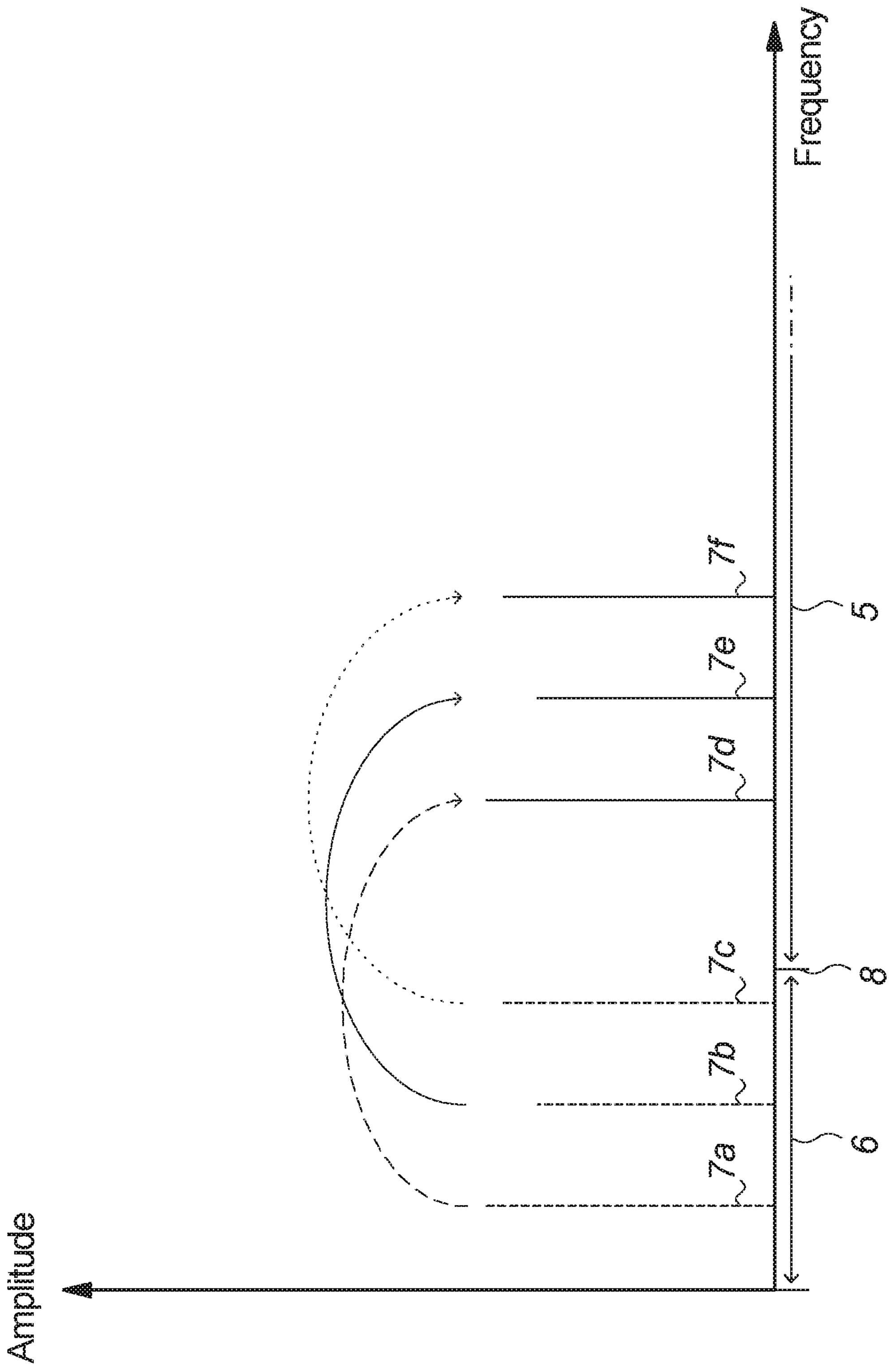
Figure 5A:
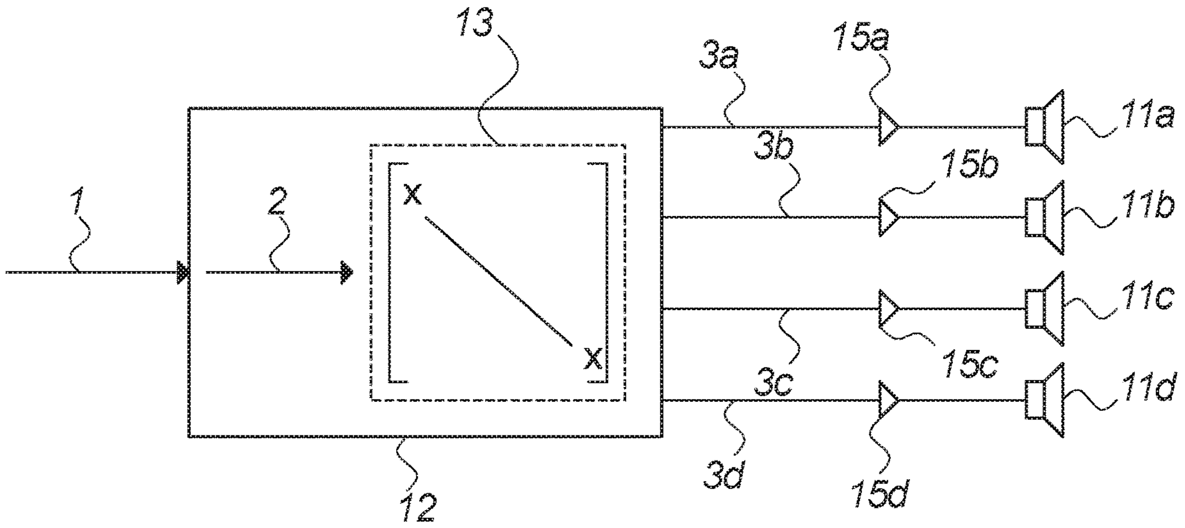
Figure 5B:
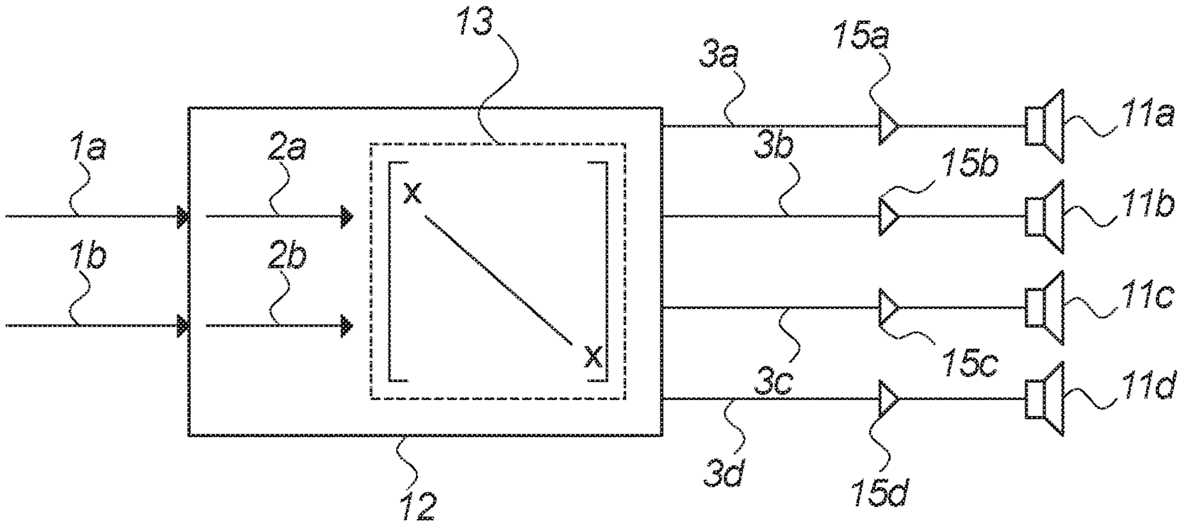
Figure 6:
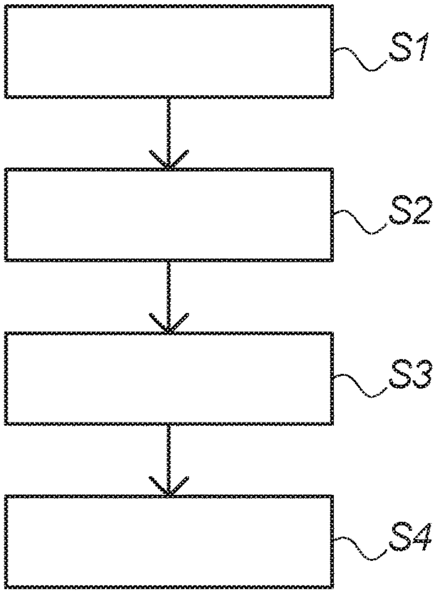
Figure 7:
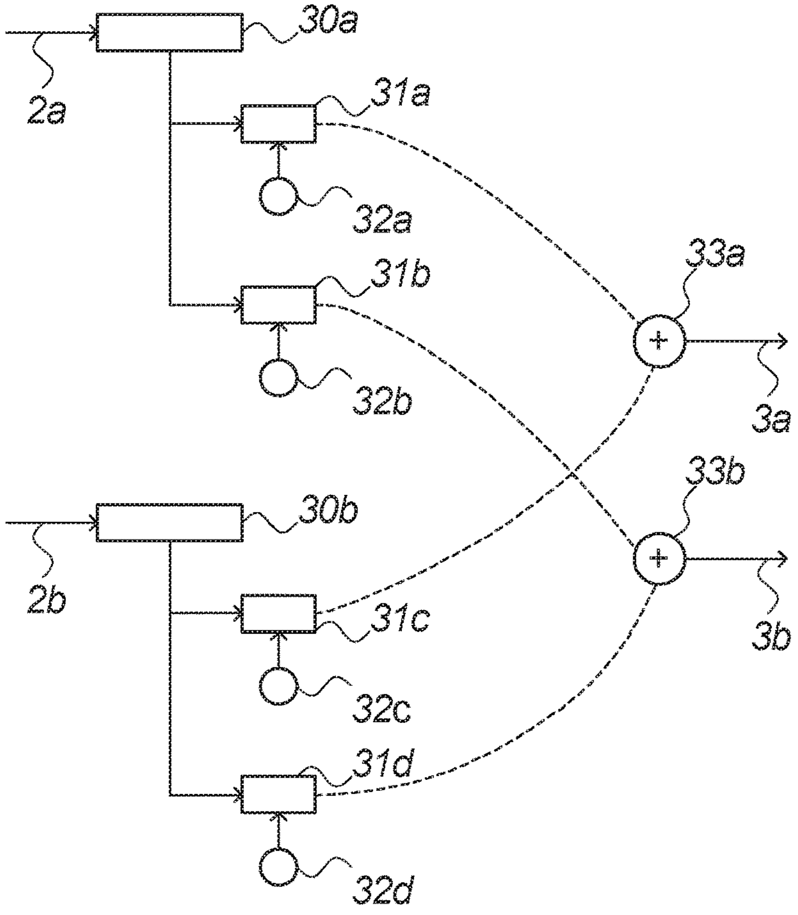
Figure 8:
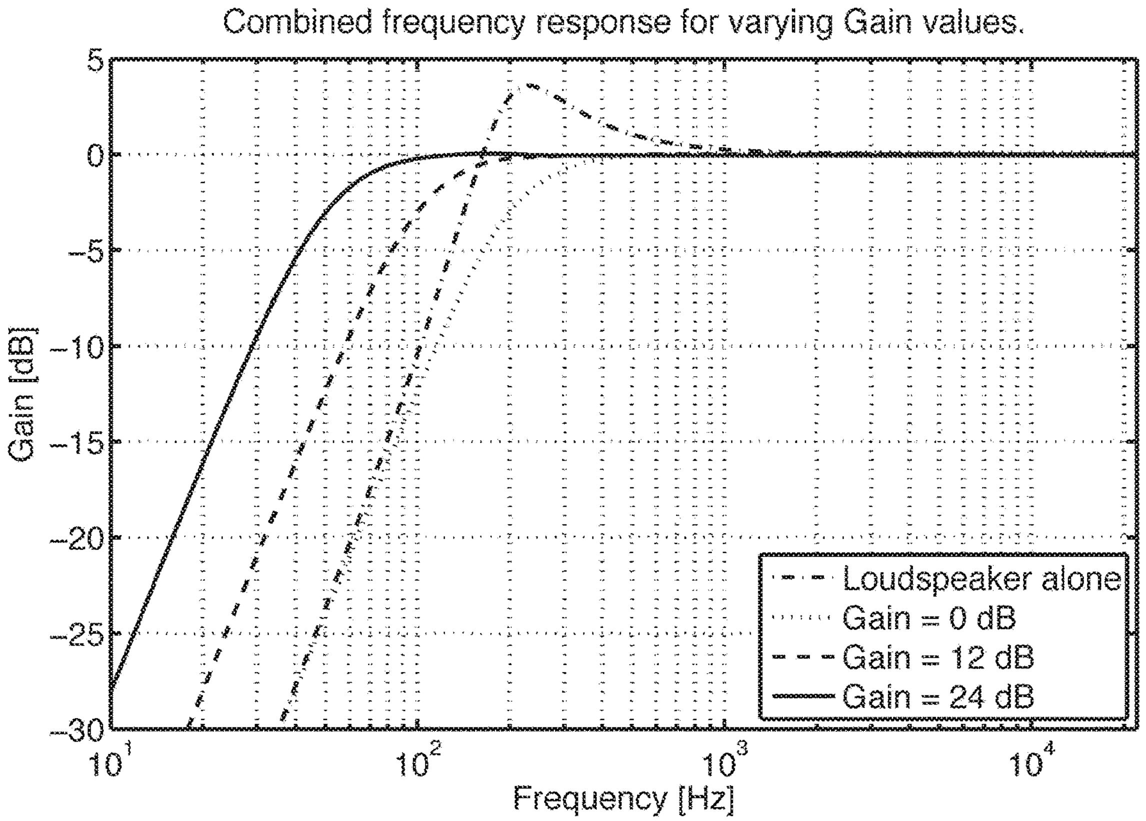
Figure 9:
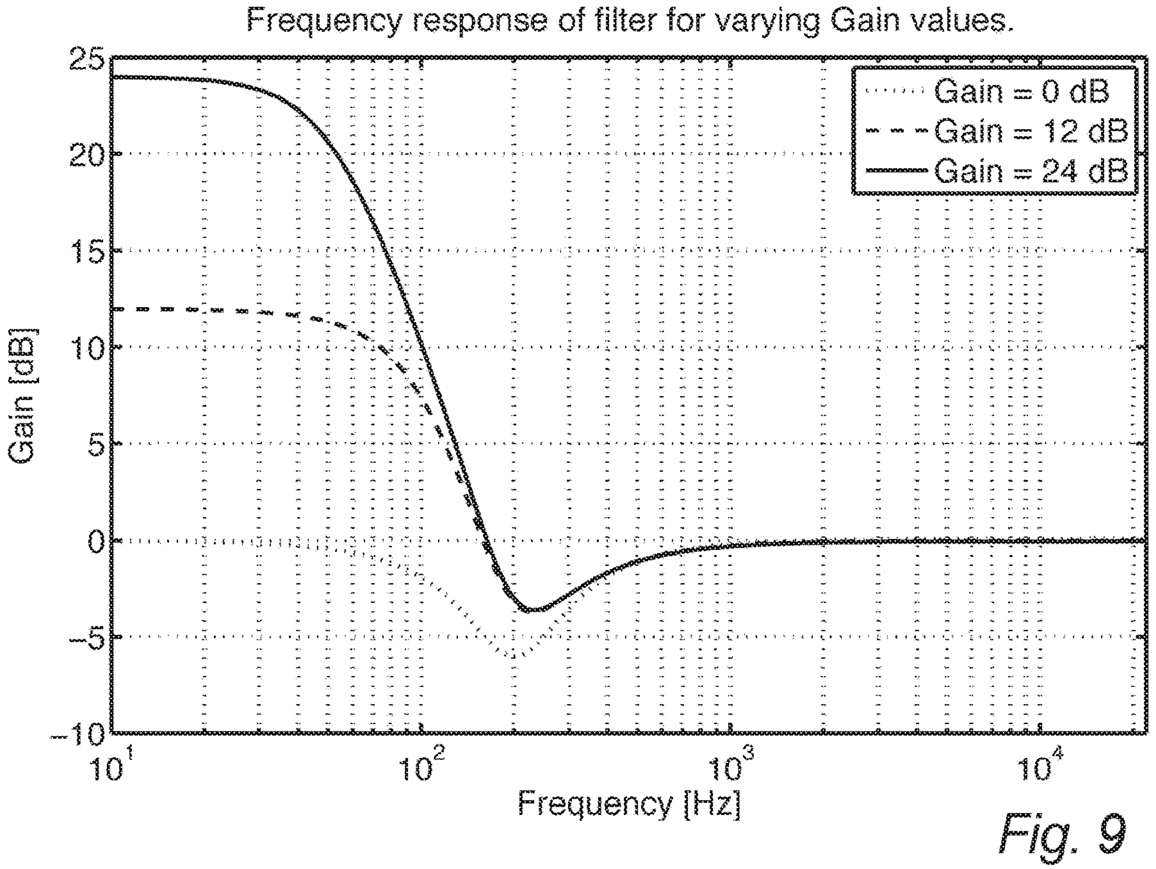
Figure 10:
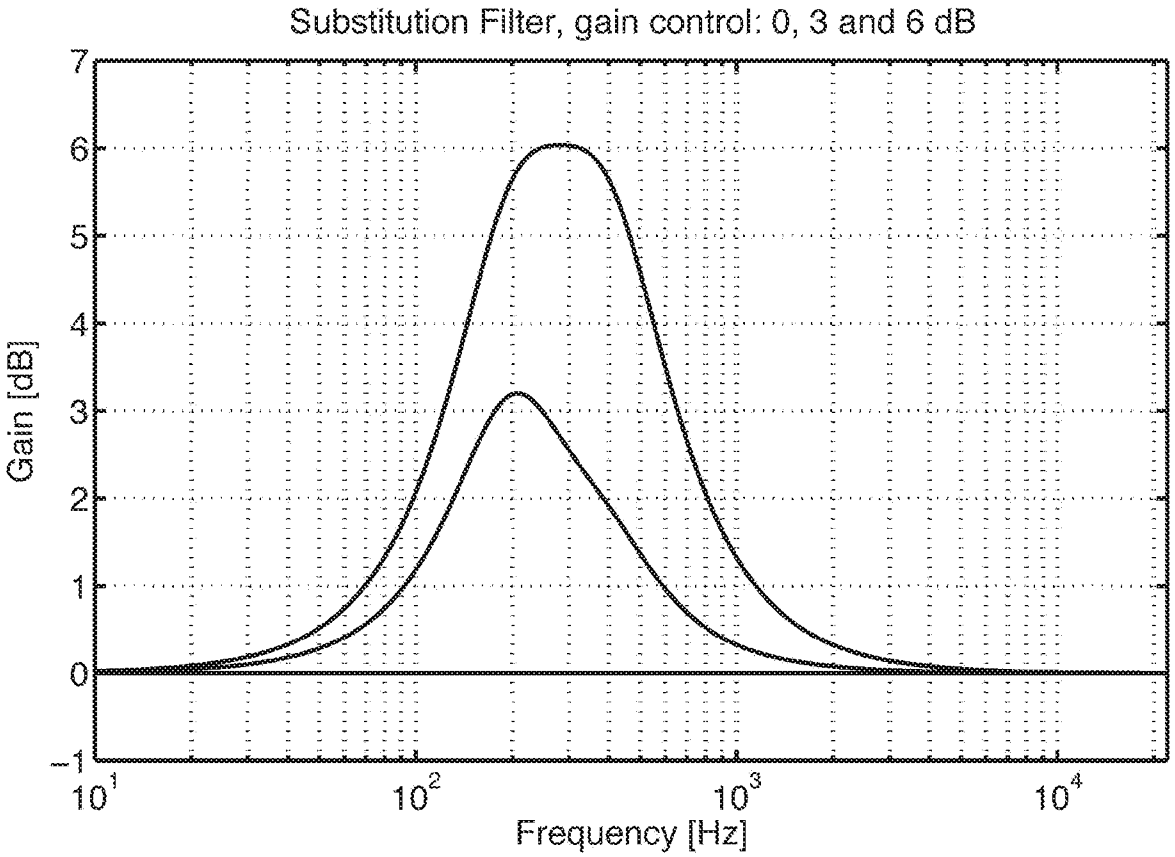
Figure 11:
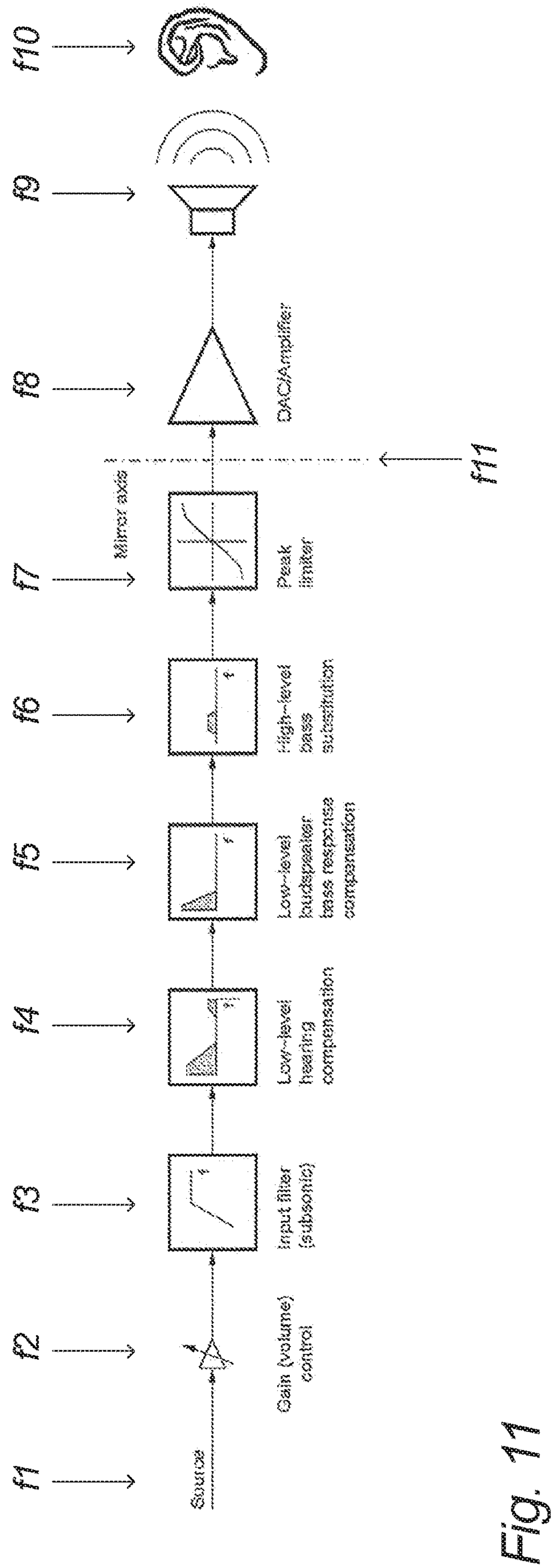
Figures 12A, 12B, 12C:
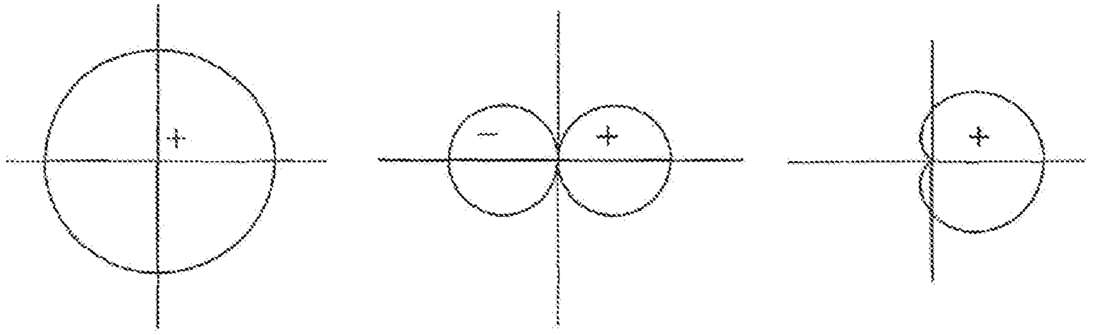
Figure 13:
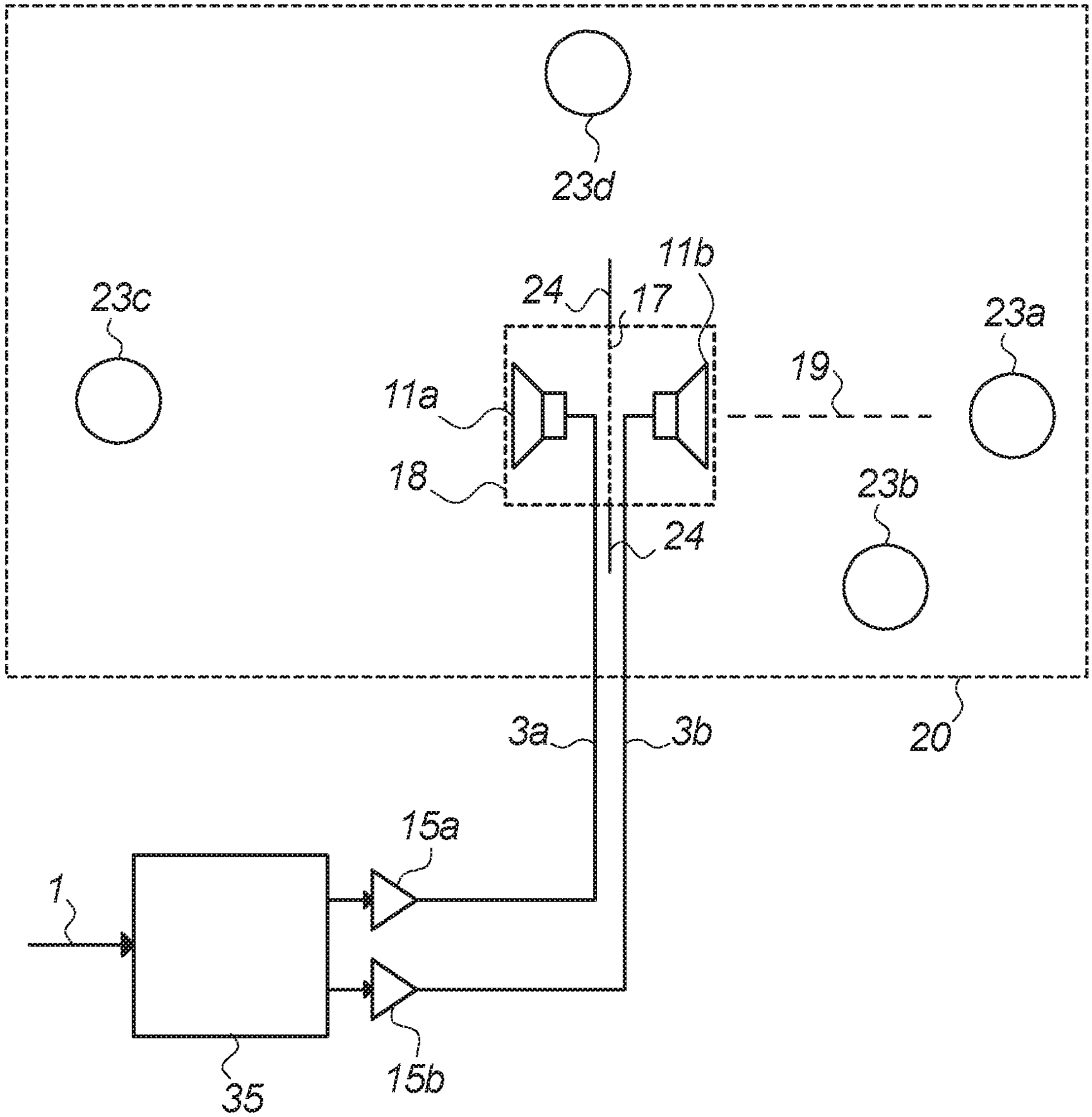
Figure 14:
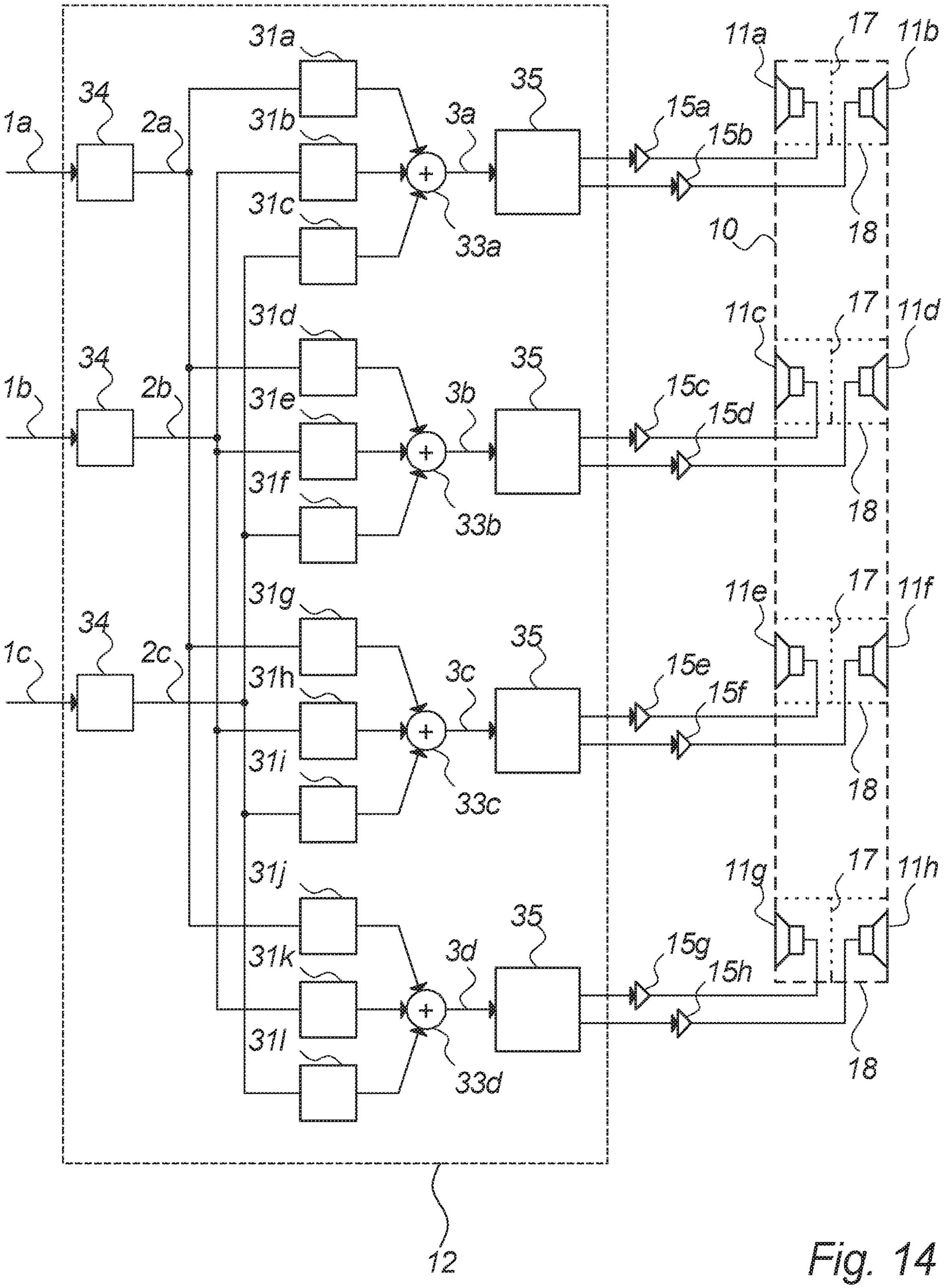
Figure 15A:
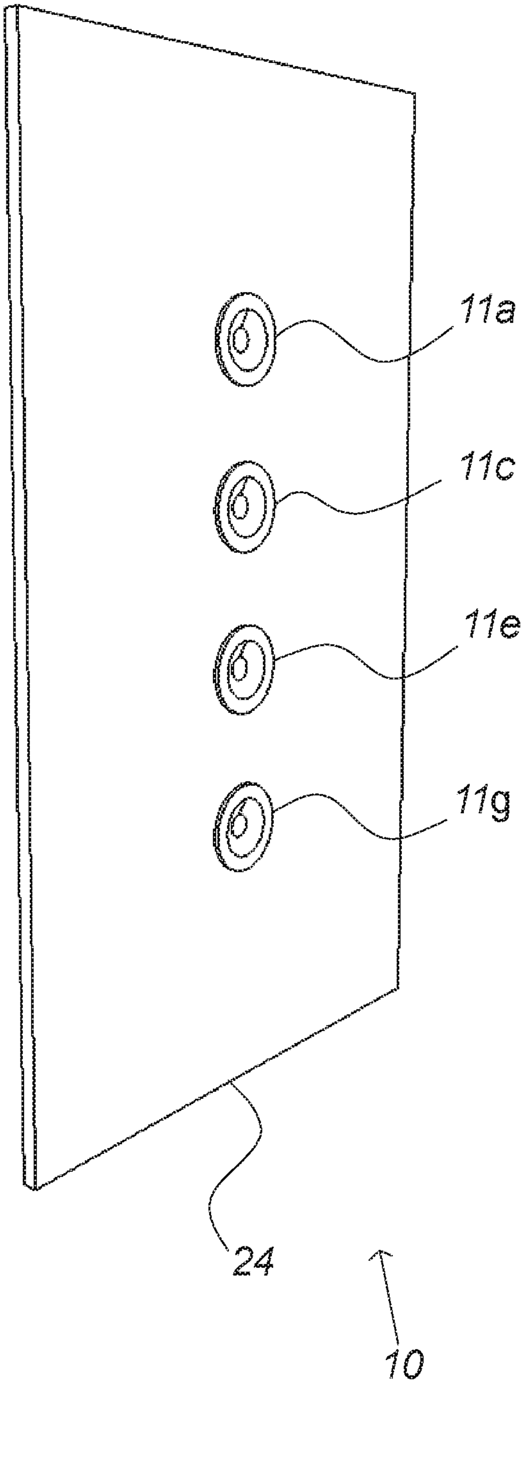
Figure 15B:
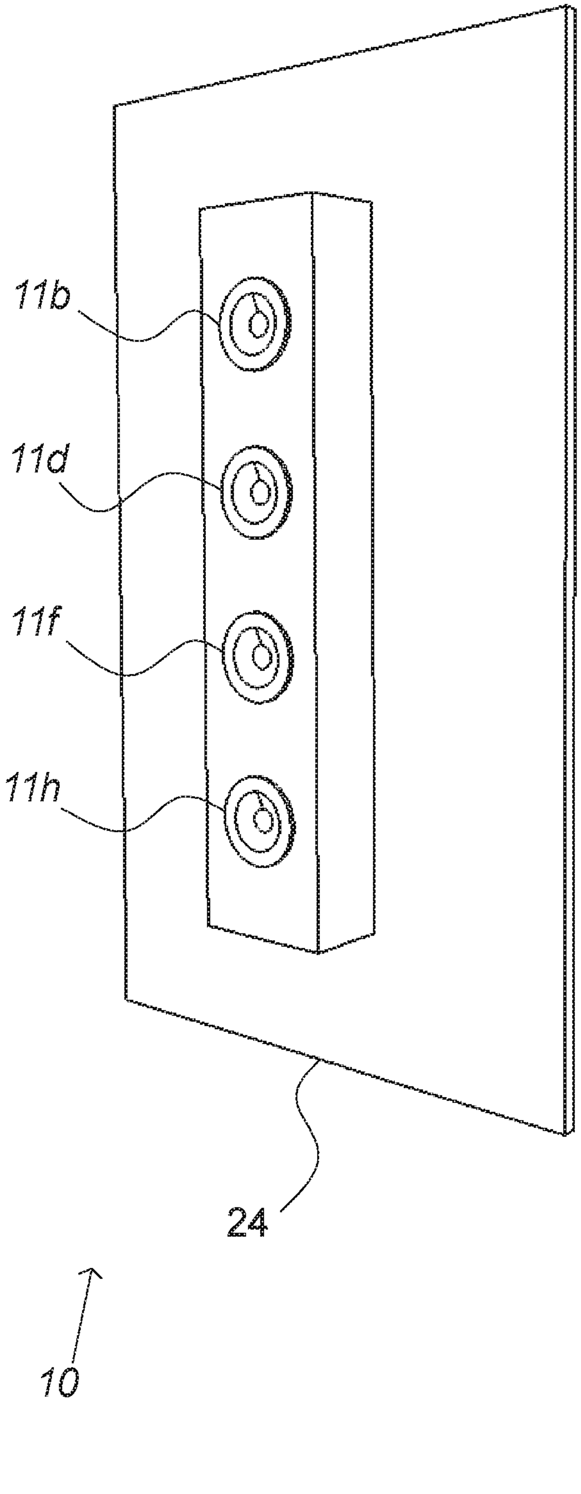
Figure 16:
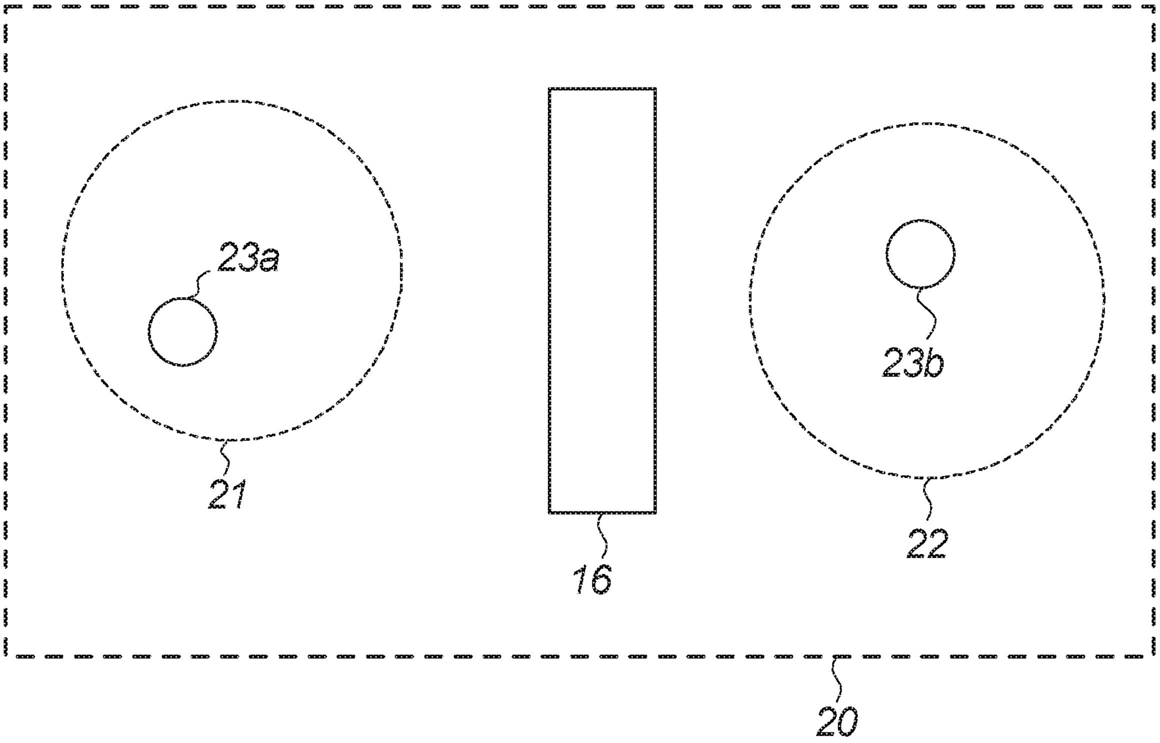

Various embodiments of the invention will in the following be described with reference to the drawings where FIG. 1 illustrates a transducer array system according to an embodiment of the present invention, FIGS. 2*a*-2*c* illustrates directional characteristics of line sources, FIG. 3 illustrates an example of an input audio signal according to embodiments of the present invention, FIG. 4 illustrates a principle of filtering harmonics in a directionally controllable frequency band as used in various methods and systems according to embodiments of the present invention, FIGS. 5*a*-*b* illustrate processing and reproduction of input audio signal(s) according to embodiments of the present invention, FIG. 6 illustrates a method for directionally reproducing an input audio signal by a transducer array according to an embodiment of the present invention, FIG. 7 illustrates a specific implementation of directional control filters according to an embodiment of the invention, FIG. 8 illustrates an example of a combined frequency response for a bass enhancement filter and a loudspeaker, FIG. 9 illustrates an example of a dynamically controlled frequency response of a bass-enhancement filter according to an embodiment of the invention, FIG. 10 illustrates a frequency response of a substitution filter according to embodiments of the present invention, FIG. 11 illustrates a block diagram of a sound reproduction system according to an embodiment of the present invention, FIGS. 12*a*-*c* illustrate examples of different radiation patterns of a gradient loudspeaker, FIG. 13 illustrates a gradient loudspeaker for use in accordance with embodiments of the present invention, FIG. 14 illustrates a transducer array system according to an embodiment of the present invention, FIGS. 15*a*-*b* illustrates a frontal view and a rear view of a transducer array according to an embodiment of the invention, and FIG. 16 illustrates an acoustical environment in which sound is reproduced in two different sound zones according to an embodiment of the present invention.

DETAILED DESCRIPTION

When playing sound through a loudspeaker system it is in many cases desirable to control the spatial radiation characteristics such that certain regions in space receive a louder signal and other regions receive a softer signal. Such a control of the directionality of sound may for example be achieved using a transducer array.

FIG. 1 illustrates a transducer array system 16 for directionally reproducing an input audio signal according to an embodiment of the present invention. The transducer array system 16 comprises a transducer array 10 comprising a plurality of transducers 11*a*-11*d* that are individually controlled by a signal processor 12 and amplified by corresponding amplifiers 15*a*-15*d*. The transducer array 10 is present within an acoustic environment 20, which in this embodiment is a room. A plurality of listeners 23*a*-23*d* are also positioned at various locations in the acoustic environment 20. Although FIG. 1 illustrates the amplifiers 15*a*-15*d* as being separate entities, they may alternatively be integral with the signal processor 12 in the sense that they form part of a common unit.

For example, it may be desirable that the listener 23*a* perceives a reproduced input audio signal 4 clearly whereas the reproduced input audio signal 4 should not be perceived by the other listeners 23*b*-23*d*, or at least barely perceived. The perception of sound at the positions of each listener 23*a*-23*d* will be defined by a mixture of the sounds reproduced by the transducers 11*a*-11*d*.

An input audio signal can be speech, music or other kind of material, which is broadband in nature, i.e., not just single sine waves. The input to the transducer array system 16 is a set of input audio signals 1*a*-1*c* which may be processed differently by a signal processor 12 such that the different listeners 23*a*-23*d* receive different combinations of the sound signals 1*a*-1*c*, e.g., different language versions of the same spoken text. In other words, the signal processor 12 produces a plurality of driving signals 3*a*-3*d*, each driving signal being for a respective transducer 11*a*-11*d*. The input audio signals 1*a*-1*c* are received in an input 14 of the transducer array system 16. The input 14 is shown as an integral part of the signal processor 12, however, according to other embodiments of the invention, the input 14 it may also be separate from the signal processor 12.

If the system 16 is only fed a single input audio signal 1, the system becomes more like a beam-steering array transducer system, with minimal energy being radiated in directions where no listeners are present which also minimises reverberation noise. Transducer array systems 16 which only takes a single input audio signal 1 as input are also contemplated by embodiments of the present invention.

Fig.1 further illustrates that the signal processor 12 of the transducer array system 16 implements directional control filters 13 which are used to generate the plurality of driving signals 3*a*-3*d* for the transducers 11*a*-11*d*. In this embodiment of the invention, the directional control filters 13 are implemented in the form of a matrix, such as a digital control filter matrix (DCFM) which is advantageous in that computational savings may be achieved, however, other implementations of the directional control filters 13 are also conceivable according to other embodiments of the invention. The filters 13 are stored in a memory (not shown) which is communicatively associated with the signal processor 12. The directional control filters of this embodiment of the invention comprise finite impulse response (FIR) filters, however, in other embodiments of the invention, the directional control filers may comprise other types of filters such as infinite response filters (IIR), or a combination of FIR and IIR filters. In addition to use of directional control filters 13, the transducer array system 16 is also arranged to filter harmonics in a directionally controllable frequency band as will be explained in relation to FIG. 4.

When using a transducer array, as such, it may be difficult to control the directionality of the low-frequency sounds. Typical transducer arrays of the prior art therefore tend to be extended in at least one direction. This is demonstrated by FIGS. 2*a-c* which show directional characteristics of line sources of different lengths, expressed as multiples of the wavelength, λ (lambda), of a signal (normalised response=1 at the main lobe). A line source, as opposed to a point source, is a source that emanates from a linear geometry. In FIGS. 2*a*-2*c*, the line sources are placed along the horizontal axis of the diagrams. The directional characteristics are three-dimensional and may be visualized by rotation of the shown characteristics around the horizontal axis.

FIG. 2*a* shows the radiation pattern (radiation lobe) of a line source having a length equal to one fourth of the wavelength λ of the signal, FIG. 2*b* shows the radiation pattern of a line source having a length equal to the wavelength λ of the signal, and FIG. 2*c* shows the radiation pattern of a line source having a length equal to four times the wavelength λ of the signal. When comparing these figures, it becomes clear that the width of radiation increases when the length of the source gets smaller compared to the wavelength of the signal.

For the purpose of the present invention, FIGS. 2*a*-2*c* are best understood by considering a line source having a fixed length, and then assuming that the figures show directional characteristics for three different single-frequency audio signals reproduced by that line source, such as sinusoidal signals. In this case, FIG. 2*a* illustrates the single-frequency signal having the highest wavelength (lambda), i.e., the lowest frequency, whereas FIG. 2*c* illustrates the single-frequency signal having smallest wavelength (lambda), i.e., the highest frequency. When considering the frequency differences between the signals of e.g., FIGS. 2*a*-2*c*, it becomes clear that for a line source the radiation lobe is narrower for higher frequencies than for lower frequencies. In other words, higher frequency signals are inherently more directional in space as opposed to lower frequency signals that exhibit more omnidirectional radiation characteristics.

For effective control of radiation direction, the sound source should ideally have a size of about one wavelength or even longer. It should be noted that even though a transducer array 10 with individually controlled transducers 11*a-h* can steer the main beam of radiation in other directions as well as create more complex forms of the radiation pattern, the directional control of the transducer array 10 depends on its size compared to the wavelength of the signal. By making the transducer array longer, the low frequencies are radiated with a narrower main lobe. Due to the large wavelengths of low frequencies, e.g., 8.6 m for 40 Hz and 1.1 m for 300 Hz, a typical transducer according to the prior art must be physically large in order to achieve a narrow main lobe of radiation. However, for space constraints and to reduce cost it is desirable to use a short transducer array. This is achieved by the methods and systems of the embodiments of the present invention as is described in the below, and in particular through the use of bass substitution which will be explained further below, and in particular with reference to FIG. 4.

The above discussion relating to FIG. 2 have served to highlight the radiation characteristics for different signals, and challenges that are inherent to directionally reproduction of low-frequency sounds, but for sake of simplicity, this discussion has only been with respect to single-frequency audio signals, such as sinusoidal signals. Typical audio signals, however, comprises multiple frequencies, as illustrated in FIG. 3.

FIG. 3 illustrates an example of an input audio signal 1 according to embodiments of the present invention. This particular example is a sound produced by a bass guitar. The frequency spectrum shown in FIG. 3 illustrates the amplitude of various frequency components in the frequency range of between 0 Hz (Hertz) and approximately 2500 Hz.

The amplitude is between around −50 and 60 (arbitrary units). Note the many harmonics 7*a*-7*m* which are integer multiples of the fundamental frequency 7*a* of 155 Hz in this case. Together the harmonics 7*a*-7*m,* when listened to by a listener 23*a-d,* provides an auditory sensation of a low frequency sound with the timbre, i.e., tone colour, defined by the relative amplitudes of the harmonics 7*a*-7*m.* Overtones which are perfect integer multiples of the fundamentals are called harmonics. It is appropriate at this point to further elaborate on the meaning of harmonics. In the present disclosure the term "harmonic" refers to modes of vibration of a system that are whole-number multiples of a fundamental mode, and also to the sounds that they generate. However, it is customary to the skilled person to stretch the definition a bit so that it includes modes that are nearly whole-number multiples of the fundamental, for example 2.005 times the fundamental rather than 2. Thus, for the purpose of the present invention, the term "harmonics" encompasses both overtones that are perfect integer multiples of a fundamental, as well as overtones that are not exactly integer multiples of a fundamental. Such non-perfect harmonics may arise to e.g., stiffness in an instrument, for example due to a stiffness in a musical string such as a bass guitar.

A principle of virtual pitch occurs in the human hearing system. Virtual pitch is the fact that the lowest, or even several of the lowest harmonics can be removed while maintaining the perceived pitch of the signal, as the pitch information is carried by the frequency distance between the harmonics present in the signal. Pitch is closely related to frequency, however the two are not equivalent. Frequency is an objective, scientific attribute that can be measured. Pitch, however, is a person's subjective perception of a sound wave, which cannot be measured. However, this does not necessarily mean that most people won't agree on which notes are higher and lower. The pitch of a signal can be maintained even when low-order harmonics of the signal are removed, however, higher-order harmonics naturally must be present in order to utilize the phenomenon of virtual pitch.

In FIG. 4 is shown a principle of filtering harmonics in a directionally controllable frequency band 5 as used according to various embodiments of the present invention. Throughout the present disclosure, filtering harmonics in a directionally controllable frequency band 5 is also referred to simply as bass substitution.

FIG. 4 shows three low-order harmonics 7*a*-7*c* of an input audio signal 1. These three low-order harmonics 7*a*-7*c* are shown to be present in a bass-frequency band 6 of the signal 1. The bass frequency band 6 is understood as a range of frequencies of sound comprising the tones of low frequency, i.e., the frequencies of sound that are concentrated around the lower end of audible sound, which generally for the human ear are frequencies of between 20 Hz and 20,000 Hz. As also seen in FIG. 4, another range of frequencies is also shown, and this frequency range is referred to as the directionally controllable frequency band 5. The directionally controllable frequency band 5 is understood as a range of frequencies of sound where the directionality of the sound is most easily controlled. As an example, a frequency of sound which when reproduced by a transducer/loudspeaker gives rise to a radiation characteristic as shown in FIG. 2*a* could be considered as a frequency present in the bass frequency band 6, whereas a frequency of sound which when reproduced by the same transducer/loudspeaker gives rise to a radiation characteristic as shown in FIG. 2*c* could be considered as a frequency present in a directionally controllable frequency band 5. The bass frequency band 6 and the directionally controllable frequency band 5 in FIG. 4 is separated by a border frequency 8, which in the present example is 500 Hz, however according to an embodiment of the invention, the border frequency 8 could be anywhere in between 200 Hz and 700 Hz. As the border frequency 8 is at 500 Hz this also entails that the three lower order harmonics 7*a*-7*c* in FIG. 3 could also be considered to be present in a bass frequency band 6.

The three low-order harmonics 7*a*-7*c* are represented by corresponding and higher order harmonics 7*d*-7*f* which are part of the same harmonic series as the lower-order harmonics 7*a*-7*c.* In particular, the higher order harmonics 7*d*-7*f* are represented by:

1) frequency shifting of the harmonics 7*a*-7*c* by an integer multiple of the lowest order harmonic 7*a,* also referred to as the fundamental, possibly in correlation with attenuation of the bass frequency band 6,
2) increasing a gain of one or more corresponding harmonics within the directionally controllable frequency band 5, possibly in correlation with attenuation of the bass frequency band 6, or
3) generating one or more corresponding harmonics within the directionally controllable frequency band 5 on the basis of one or more lower order harmonics, possibly in correlation with attenuation of the bass frequency band 6.

These three different ways of representing low-order harmonics by higher order harmonics are all considered as filtering harmonics in a directionally controllable frequency band 5 according to embodiments of the present invention.

FIG. 5*a* illustrates a processing and reproduction of an input audio signal 1 according to embodiments of the present invention. An input audio signal 1 is processed by the signal processor 12 to produce a processed audio signal 2. This processing comprises filtering harmonics in a directionally controllable frequency band 5. The signal processor 12 generates a plurality of driving signals 3*a*-3*d* on the basis of the processed audio signal 2 by applying directional control filters 13, which in this embodiment comprises FIR filters. The driving signals 3*a*-3*d* are amplified by amplifiers 15*a*-15*d* before being sent to the transducers 11*a*-11*d* for reproduction of the input audio signal 1. In this way the input audio signal 1 is directionally reproduced, and by adjustment of the directional control filters 13 the transducers 11*a*-11*d* may reproduce the input audio signal in a desired direction in space, such as at desired position in an acoustical environment 20 as shown in FIG. 1.

FIG. 5*b* illustrates a processing and reproduction of a plurality of input audio signals 1*a*-1*b* according to embodiments of the present invention. FIG. 5*b* resembles the processing and reproducing of FIG. 5*a*, however, as shown in FIG. 5*b* two input audio signals 1*a*-1*b* are processed by the signal processor 12. The first input audio signal 1*a* and the second input audio signal 1*b* are different and distinct signals. As an example, the first input audio signal 1*a* may be an audio signal comprising music and the second input audio signal may be a speech signal such as a narration of a book. The signal processor processes the first input audio signal 1*a* and the second input audio signal 1*b* to generate a first processed audio signal 2*a* and a second processed audio signal 2*b* respectively. As with the embodiment of FIG. 5*a*, the processing comprises filtering harmonics in a directionally controllable frequency band 5. The signal processor 12 generates a plurality of driving signals 3*a*-3*d* on the basis of the first processed audio signal 2*a* and the second processed audio signal 2*b* by applying directional control filters 13, which in this embodiment comprises FIR filters. The driving signals 3*a*-3*d* are amplified by amplifiers 15*a*-15*d* before being sent to the transducers 11*a*-11*d* for reproduction of both the first input audio signal 1*a* and the second input audio signal 1*b*. In this way the input audio signals 1*a*-1*b* are directionally reproduced, and by adjustment of the directional control filters 13 the transducers 11*a*-11*d* may reproduce the input audio signals 1*a*-1*b* in respective desired directions in space, such as two desired positions in an acoustical environment 20 as shown in FIG. 1. In this way a first listener 23*a* and a second listener 23*b* may experience reproductions of different input audio signals at different positions within the acoustical environment using the same transducer array system 16. For example, the first listener 23*a* may only perceive the music whereas the second listener may only perceive the narration of the book despite the fact that the two listeners 23*a*-23*b* are within the same room/acoustical environment 20.

Although FIGS. 5*a*-5*b* illustrate the amplifiers 15*a*-*d* as being separate entities, they may alternatively be integral with the signal processor 12 in the sense that they form part of a common unit. In a preferred embodiment of the invention, the signal processor 12, amplifiers 15*a*-*d*, and the transducer array 10 are integrated in a common casing or enclosure.

It should also be noted that the present systems and methods described herein are also capable of handling more than two input audio signals, such as three or more input audio signals.

FIG. 6 illustrates a method for directionally reproducing an input audio signal by a transducer array comprising a plurality of transducers according to an embodiment of the present invention.

In a first step S1, an input audio signal 1 is received. The input audio signal 1 may be received in an input of a transducer array system 16 comprising a transducer array 10 having a plurality of transducers 11*a*-*h*.

In a second step S2, the received input audio signal 1 is processed by signal processing, e.g., by a signal processor 12, to generate a processed audio signal 2. This step includes filtering harmonics in a directionally controllable frequency band 5 as for example described in relation to FIG. 4.

In a third step S3, the processed audio signal 2 is further processed by signal processing, e.g., by a signal processor 12, to generate a plurality of driving signals 3*a*-3*d*. This processing includes application of directional control filters 13 as for example described in relation to FIG. 5*a*.

In a fourth step S4, the input audio signal 1 is directionally reproduced on the basis of the plurality of generated driving signals 3*a*-3*d* using a transducer array 10, such as a transducer array 10 of a transducer array system 16.

Referring to FIG. 5*a*, the signal processor 12 is seen to receive one input audio signal 1 and generate four driving signals 3*a*-3*d*. This is an example of an M=1, N=4 setup, with M denoting the number of inputs, and N denoting the number of outputs. The matrix implementation of the directional control filters 13 is an M×N, i.e., a 1×4 matrix. Similarly, the matrix implementation of the directional control filters 13 in FIG. 5*b* is a 2×4 matrix.

FIG. 7 shows a specific implementation of the directional control filters 13 in a M×N=2×2 situation, according to an embodiment of the invention. The two inputs, which are processed audio signals 2*a*-2*b*, are input to respective tapped delay lines 30*a*-30*b*. The calculation boxes 31*a*-31*d* use samples in the tapped delay lines 30*a*-30*b*, sharing a sample memory (not shown) for all directional control filters working on the same input. As shown, the filter calculations utilize the corresponding sets of filter coefficients 32*a*-32*d* which are stored in a memory (not shown). As shown, the calculated value (sum of products) from the first filter calculation box 31*a* is input to the first signal adder 33*a*, where it is added with the calculated value (sum of products) from the third filter calculation box 31*c*. Similarly, the calculated value (sum of products) from filter calculation box 31*b* is input to the second signal adder 33*b*, where it is added with the calculated value (sum of products) from the fourth filter calculation box 31*d*. The combined values obtained from the two signal adders 33*a*-33*b* are the output values or driving signals 3*a*-3*b*. Of course, the process is performed as each new sample of the input audio signals 2*a*-2*b* arrives.

Thus, in the general case of M inputs and N outputs, the processing is as follows:

With every tick of a sample clock:

1) The M tapped delay lines 30*a*-*b* are updated with a respective new input sample value.
2) The M×N product summations between the M×N coefficient sets and the contents of the M tapped delay-lines are calculated.
3) For each n of the N outputs: Sum up the M product sums contributing to output n producing the new output sample for the nth output.

Often, small loudspeaker drivers are used in arrays in order to get a well-controlled directional response at high frequencies. It is well known that small loudspeaker drivers typically are less capable at reproducing low frequencies than larger loudspeakers. Therefore, the very low frequencies are often amplified by a signal-dependent low-frequency gain filter to compensate. Such a functionality is called a dynamic bass enhancement filter.

FIG. 8 illustrates an example of a combined frequency response for a bass enhancement filter and a loudspeaker. The figure shows gain in units of dB (decibel) within a range from −30 dB to 5 dB and within a frequency range from 10 Hz to above 20 kHz for a loudspeaker alone (curve having a positive peak at around 200 Hz), and for combined responses with varying gain values of 0 dB, 12 dB and 24 dB from right to left in the graph.

As seen in FIG. 8, depending on the input level, the low-frequency gain is adjusted dynamically, such that the corner frequency is low for low input levels and higher for higher input levels. Effectively that means that the low-frequency output level, around 50 Hz to 200 Hz in this case, can be kept almost constant—and if the level is chosen appropriately—audible for an intended listener but inaudible for those listeners which are not to be disturbed by the transducer array 10.

The technique of using a dynamically controlled bass amplification is capable of providing a surprisingly good impression of bass, even though the bass is only present at its full relative level at low levels. An example of the dynamically controlled frequency response of a bass-enhancement filter according to an embodiment of the invention is shown in FIG. 9.

FIG. 9 shows gain in units of dB (decibel) within a range from −10 dB to 25 dB and within a frequency range from 10 Hz to above 20 kHz for frequency responses of filters having varying gain values of 0 dB, 12 dB and 24 dB from the bottom to the top in the graph.

In order to improve the impression of bass at higher levels, and without destroying the directional characteristics of the transducer array 10, the technique of filtering harmonics in the directionally controllable frequency band 5 as described above, in particular with reference to FIG. 4, is utilized.

According to embodiments of the present invention, the lowest harmonics are sometimes filtered away by a filter, of which an example response is shown in FIG. 8. In order to maintain the perceived loudness of the bass signal when the lower corner frequency of the transfer moves upwards, some harmonics at a higher frequency band, i.e., the directionally controllable frequency band 5 are amplified by means of another dynamically controlled filter. This filter may be referred to as a substitution filter and may have frequency responses as illustrated in FIG. 10, depending on the input level. FIG. 10 shows the gain of the substitution filter in units of dB (decibel) within a range from −1 dB to 7 dB and within a frequency range from 10 Hz to above 20 kHz for various gain control settings: top curve=6 dB, middle curve=3 dB and lower curve (seen as a flat line)=0 dB.

FIG. 11 illustrates a block diagram of a sound reproduction system according to an embodiment of the present invention. The block diagram may be viewed as a processing chain comprising figure features f1-f10 arranged from left to right in ascending order. At the very beginning of the processing chain, at figure feature f1, an original source signal, or input audio signal 1, input. Modifications to the signal, which relate closely to properties of the end of the chain, the hearing system should therefore be placed near the source signal. The two elements in the present block diagram which are related directly to the hearing systems are the overall gain control, figure feature f2, (commonly called the volume control), and the low-level hearing compensation, figure feature f4. Limitations of the processing and reproduction chain should be mirrored in a similar way. The maximum allowed voltage fed to the power amplifier, figure feature f8 (DAC/Amplifier), should be limited at the output of the processor chain, so the mirror axis, figure feature f11, is placed just at the interface between processing, figure features f2-f7, and amplifier, figure feature f8, at least in the proposed block diagram.

In between these two parts are those which relate to limitations of the loudspeaker, figure feature f9, including its enclosure and physical arrangement. Two elements handle the loudspeaker limitations: The first and most important is the compensation for the reduced gain of the loudspeaker at low frequencies, figure feature f5. As this compensation implies a filter with large gain at low frequencies, mechanical thermal, and electrical constraints of the loudspeaker and amplifier will apply at higher levels. The compensation is therefore gradually decreased at higher levels.

In order to maintain at least a part of the low frequency power (or loudness) the second element comes into action, namely substitution, figure feature f6. The substitution element comprises a filter which gradually increases its gain at mid-bass frequencies as the gain of the loudspeaker compensation filter is reduced—see for example FIG. 10 which illustrates a substitution filter.

Although shown specifically in the figure, the input filter and/or peak limiter may be omitted according to other embodiments of the invention.

As shown in FIG. 11, an input filter, figure feature f3, is provided for cutting away non-audible signal contents, e.g. below 40 Hz, in order to protect the amplifier and loudspeaker and the rest of the system from high energy signals which may otherwise be non-audible.

Also as shown in FIG. 11, a peak limiter, figure feature f7, is provided at the end of the chain for ensuring that no potentially destructive peaks are let through the power stage and loudspeaker. Such peaks may be produced by the gain blocks, in particular if all gain blocks boosts the same incoming peak.

A way to further improve the directional control of a transducer array 10 is to let each transducer 11*a-d* in the transducer array 10 have a directional characteristic based on sound pressure gradient. The basic directional characteristics of a single first-order directional sound source (or sound receiver) is illustrated in FIGS. 12*a*-12*c* with three basic shapes: a sphere shape in FIG. 12*a*, a figure-of-eight shape in FIG. 12*b*, and a cardioid shape in FIG. 12*c*. The three characteristics, and intermediate forms, can be composed of a pure pressure combined with a pure pressure gradient, with varying factors to each component. For example, the spherical shape in FIG. 12*a* comprises only a pressure component and no pressure gradient. The figure-of-eight shape in FIG. 12*b*, on the other hand, comprises only a pressure gradient component. The cardioid shape in FIG. 12*c* comprises both a pressure component and a pressure gradient component. By using higher order gradient components, more complicated radiation patterns can be achieved.

A gradient loudspeaker can be constructed as illustrated in FIG. 13, with the two transducers 11*a-b* mounted in an enclosure 18 separated by an acoustic partition 17 ensuring that sound emanating from the back of the transducers 11*a-b* does not interfere with the reproduction of sound by the two transducers 11*a-b*. The input audio signal 1 is fed to a gradient processing block 35 which controls the processes the input audio signal 1 which through the amplifiers 15*a-b* control the two transducers 11*a-b*. The gradient processing block 35 may be implemented in a signal processor 12, such as a digital signal processor. For the simplest radiation pattern, the spherical pressure characteristics shown in FIG. 12*a*, the transducers 11*a-b* are fed with identical driving signals 3*a-b*. With that characteristic, all listeners 23*a-d* will receive the sound corresponding to the input audio signal 1. Feeding instead the transducers 11*a-b* with identical signals, but with opposite sign, the figure-of-eight characteristic of FIG. 12*b* is achieved, thereby emitting a minimum of sound to listener 23*d* but keeping the full level at listener 23*a*. If instead it is desirable to keep the sound pressure level at listener 23*c* at a minimum, a cardioid characteristic as shown in FIG. 12*c* can be applied by appropriate weighting of the pressure component and the pressure gradient component to the two transducers 11*a-b*. Both the figure-of-eight and the cardioid characteristic, as well as intermediate forms, reduce the sound emitted to listeners not placed along the main axis 19. By applying filtering in the gradient processing block 35 the directional characteristic can be made frequency-dependent. As seen in FIG. 13, the gradient loudspeaker comprises a baffle 24 which separates the two transducers 11*a-b* of the gradient loudspeaker. The baffle 24 improves the efficiency of the gradient loudspeaker by reducing the likelihood of acoustic shortening between the two transducers 11*a-b*.

Although FIG. 13 shows that the gradient loudspeaker can be realized by use of oppositely facing transducers 11*a-b*, it must be noted that a gradient loudspeaker may still be realized using a single transducer. The sound emanating from the back side of a vibrating diaphragm has inverse polarity relative to the sound emanating from the front side of the diaphragm. If the rear radiation is constrained by an enclosure but allowed to exit the enclosure through a port located at a distance from the origin of the front radiation; and, if the rear radiation is delayed by an appropriately designed acoustical system, then a cardioid radiation pattern may be produced over a limited bandwidth. Such a device is referred to as a passive cardioid loudspeaker.

According to an embodiment of the invention, the transducer array comprises gradient loudspeakers realized by the arrangement of transducers 11*a-b* as shown in FIG. 13, however, according to another embodiment of the invention, the transducer array may also comprise gradient loudspeakers that are realized in a passive way, such as passive cardioid loudspeakers.

The gradient loudspeaker, and associated signal processing, may advantageously be combined with bass substitution according to embodiments of the invention.

FIG. 14 shows another specific implementation of the directional control filters 13 according to an embodiment of the invention, where the filters are used for a transducer array system 16 comprising a transducer array 10 comprising a plurality of transducers 11*a*-11*h* arranged such that gradient loudspeakers are realized—see for example FIGS. 12*a-c* and FIG. 13 for a detailed description of an example of a gradient loudspeaker. A plurality of input audio signals 1*a*-1*c* are received in a signal processor 12 wherein they are first processed by performance of bass substitution 34, as explained in any of the above, to generate corresponding processed audio signals 2*a*-2*c*. The processed audio signals 2*a*-2*c* are delayed in a similar way as for the signals in FIG. 7 (tapped delay lines are not shown in the figure), and calculation boxes 31*a*-31*l* use samples in the tapped delay lines, sharing a sample memory (not shown) for all directional control filters working on the same input. The filter calculations utilize the corresponding sets of filter coefficients (not shown) which are stored in a memory (not shown). As shown, the calculated value (sum of products) from the first filter calculation box 31*a* is input to the first signal adder 33*a*, where it is added with the calculated value (sum of products) from the second filter calculation box 31*b* and the calculated value (sum of products) from the third filter calculation box 31*c*, such that a first driving signal 3*a* is generated. A similar procedure occurs for the signal second adder 33*b*, the third signal adder 33*c*, and the fourth signal adder 33*d*, such that further driving signals 3*b*-3*d* are generated.

The combined signals from the signal adders 33*a*-33*d* are fed to respective gradient processing blocks 35. The gradient processing block of this embodiment is implemented in the signal processor 12, however it may also be implemented in another dedicated signal processor. The gradient processing blocks 35 controls the transducers 11*a-h* of the gradient loudspeakers through respective amplifiers 15*a*-15*h*. In another embodiment of the invention, the gradient loudspeakers may be realized using single transducers, i.e., the gradient loudspeakers may be passive gradient loudspeakers.

FIGS. 15*a* and 15*b* respectively illustrates a frontal view and a rear view of a transducer array 10 according to an embodiment of the invention where a number of gradient loudspeakers of a transducer array 10 are made up by a plurality of transducers 11*a-h*. Each of the gradient loudspeakers comprises two respective transducers which are placed on a baffle 24, such that radiation in opposite directions does not cancel in an unwanted way. FIGS. 15*a* and 15*b* shows just four sets of gradient loudspeakers, however it is to be understood that the transducer array 10 can comprise any number of transducers 11*a-h* and gradient loudspeakers. In an alternative embodiment of the invention, a gradient loudspeaker is constructed by purely acoustic means by mounting the transducer in an enclosure 18 with partly open back, e.g., by using a port, thereby letting the opening replace the second transducer/loudspeaker of the gradient loudspeaker. Use of such acoustic means, also referred to as gradient control elements throughout this disclosure, is well known in the art, both for loudspeakers and especially for microphones.

FIG. 16 illustrates an acoustical environment 20 in which sound is reproduced in two different sound zones according to an embodiment of the present invention. As seen, the acoustic environment 20, which may be a room, comprises two distinct sound zones that are non-overlapping in space: a first sound zone 21 and a second sound zone 22. A first listener is placed in 23*a* is present within the first sound zone 21, and a second listener 23*b* is present in the second sound zone 22. A transducer array system 16 is further present in the acoustic environment 20. For example, the transducer array system 16 comprising the transducer array may be located on/at a ceiling of the room/acoustic environment 20. The transducer array system 16 is arranged to carry out a method in which two distinct input audio signals, such as a first input audio signal and a second input audio signal, are directionally reproduced in the two respective sound zones. Thus, the first input audio signal is directionally reproduced in the first sound zone 21 and the second input audio signal is directionally reproduced in the second sound zone 22. The transducer array system 16 may for example utilize the processing of input audio signals as disclosed in relation to FIG. 5*b*. In this way, the first listener 23*a* present in the first sound zone 21 may experience an audible sensation different than the second listener 23*b* present in the second sound zone 22, although the two listeners are both present within the same acoustical environment 20.

LIST OF REFERENCE SIGNS

1, 1*a*-1*c* Input audio signal
2, 2*a*-2*b* Processed audio signal
3*a*-3*d* Driving signal
4 Reproduced input audio signal
5 Directionally controllable frequency band
6 Bass frequency band
7*a*-7*m* Harmonics
8 Border frequency
10 Transducer array
11*a*-11*h* Transducers
12 Signal processor
13 Directional control filter
14 Input
15*a*-15*h* Amplifiers
16 Transducer array system
17 Acoustic partition
18 Enclosure
19 Main axis
20 Acoustical environment
21 First sound zone
22 Second sound zone
23*a*-23*d* Listeners
24 Baffle
30*a*-30*b* Tapped delay line
31*a*-31*l* Calculation box
32*a*-32*d* Filter coefficient
33*a*-33*d* Signal adder
34 Bass substitution
35 Gradient processing block
S1-S4 Method steps
f1-f11 Figure features

The invention claimed is:

1. A method for directionally reproducing an input audio signal by a loudspeaker array comprising a plurality of loudspeakers including one or more gradient loudspeakers, the method comprising steps of:

receiving said input audio signal;

processing said input audio signal by signal processing to generate a processed audio signal, wherein said step of processing comprises a step of filtering harmonics in a directionally controllable frequency band, each of said harmonics corresponding to a lower order harmonic in a bass frequency band of said input audio signal, wherein said bass frequency band comprises frequencies below said directionally controllable frequency band, and wherein the step of processing includes attenuating said bass frequency band of said input audio signal relative to said directionally controllable frequency band, said attenuation depending on a playback level;

generating a plurality of driving signals for said plurality of loudspeakers by signal processing, wherein said plurality of driving signals are generated based on said processed audio signal by application of directional control filters; and reproducing directional sound representing said input audio signal based on said plurality of driving signals using said loudspeaker array.

2. The method according to claim 1, wherein said step of processing said input audio signal comprises attenuating said bass frequency band of said input audio signal.

3. The method according to claim 1, wherein said step of filtering harmonics comprises representing one or more of said lower order harmonics by harmonics within said directionally controllable frequency band.

4. The method according to claim 1, wherein said step of filtering harmonics comprises increasing a gain of one or more harmonics within said directionally controllable frequency band.

5. The method according to claim 1, wherein said step of filtering harmonics comprises generating one or more harmonics in said directionally controllable frequency band based on one or more of said lower order harmonics.

6. The method according to claim 1, wherein said step of filtering harmonics comprises frequency shifting one or more of said lower order harmonics of said bass frequency band to said directionally controllable frequency band.

7. The method according to claim 1, wherein processing said step of input audio signal is performed based on an analysis of said input audio signal, and wherein said analysis comprises detecting a presence of one or more lower order harmonics in said bass frequency band.

8. The method according to claim 1, wherein said bass frequency band and said directionally controllable frequency band are separated in frequency by a border frequency, and wherein said border frequency ranges from 200 Hz to 700 Hz.

9. The method according to claim 1, wherein said directional control filters are applied using any methods of acoustic contrast control or pressure matching.

10. The method according to claim 1, wherein said directional control filters comprise any of finite impulse response filters, infinite impulse response filters, or any combinations thereof.

11. The method according to claim 1, wherein said directional control filters comprise integrating finite impulse response filters.

12. The method according to claim 1, wherein said step of generating a plurality of driving signals further comprises gradient processing.

13. The method according to claim 1, wherein said input audio signal is directionally reproduced within an adaptive sound zone of an acoustical environment, and wherein said input audio signal is directionally reproduced in said adaptive sound zone by application of adaptive directional control filters.

14. The method according to claim 1, wherein said input audio signal is a first input audio signal, said processed audio signal is a first processed audio signal, and wherein the method further comprises steps of:

receiving a second input audio signal, said second input audio signal being different from said first input audio signal;

processing said second input audio signal by signal processing to generate a second processed audio signal, wherein said step of processing said second input audio signal comprises a step of filtering harmonics in a directionally controllable frequency band, each of said harmonics corresponding to a lower order harmonic in a bass frequency band of said second input audio signal;

generating a plurality of driving signals for said plurality of loudspeakers by signal processing, wherein each driving signal is generated based on said directionally controlled frequency band of said first processed audio signal and said second processed audio signal by application of directional control filters; and reproducing directional sound representing said first input audio signal and said second input audio signal based on said plurality of driving signals using said loudspeaker array.

15. The method according to claim 14, wherein said first input audio signal is directionally reproduced in a first sound zone and wherein said second input audio signal is directionally reproduced in a second sound zone, and wherein an acoustical environment comprises said first sound zone and said second sound zone.

16. A loudspeaker array system for directionally reproducing an input audio signal comprising:

an input arranged to receive the input audio signal;

one or more signal processors; and a plurality of loudspeakers including one or more gradient loudspeakers;

wherein said one or more signal processors are configured to process said input audio signal to generate a processed audio signal, wherein said input audio signal is processed by filtering harmonics in a directionally controllable frequency band, each of said harmonics corresponding to a lower order harmonic in a bass frequency band of said input audio signal, wherein said bass frequency band comprises frequencies below said directionally controllable frequency band, and wherein said processing includes attenuating said bass frequency band of said input audio signal relative to said directionally controllable frequency band, said attenuation depending on a playback level;

wherein said loudspeaker array system is arranged to generate a plurality of driving signals based on said processed audio signal by application of directional control filters; and wherein said plurality of loudspeakers are configured to directionally reproduce said input audio signal based on said plurality of driving signals.

17. The loudspeaker array system according to claim 16, wherein said loudspeaker array system comprises a plurality of amplifiers, each amplifier of said plurality of amplifiers being configured to adjust a gain of a generated driving signal and provide a gain- adjusted generated driving signal to a respective loudspeaker of said plurality of loudspeakers.

18. The loudspeaker array system according to claim 16, wherein said loudspeaker array system is arranged in an enclosure.

19. A method for directionally reproducing an input audio signal by a loudspeaker array comprising a plurality of loudspeakers, wherein said plurality of loudspeakers comprises one or more gradient loudspeakers, the method comprising steps of:

receiving said input audio signal;

processing said input audio signal by signal processing to generate a processed audio signal, wherein said step of processing comprises a step of filtering harmonics in a directionally controllable frequency band, each of said harmonics corresponding to a lower order harmonic in a bass frequency band of said input audio signal, wherein said bass frequency band comprises frequencies below said directionally controllable frequency band, and wherein said processing includes attenuating said bass frequency band of said input audio signal relative to said directionally controllable frequency band, said attenuation depending on a playback level;

generating a plurality of driving signals for said plurality of loudspeakers by signal processing, wherein said plurality of driving signals are generated based on said processed audio signal by application of directional control filters; and reproducing directional sound representing said input audio signal based on said plurality of driving signals using said loudspeaker array, wherein said input audio signal is directionally reproduced within a sound zone of an acoustical environment.

* * * * *